(12) United States Patent
Park

(10) Patent No.: US 7,516,273 B2
(45) Date of Patent: Apr. 7, 2009

(54) WRITE-ONCE OPTICAL DISC AND METHOD FOR RECORDING MANAGEMENT INFORMATION THEREON

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 551 days.

(21) Appl. No.: 10/934,495

(22) Filed: Sep. 7, 2004

(65) Prior Publication Data

US 2005/0055500 A1    Mar. 10, 2005

(30) Foreign Application Priority Data

Sep. 8, 2003  (KR) .................. 10-2003-0062674
May 20, 2004 (KR) .................. 10-2004-0036073

(51) Int. Cl.
*G06F 12/00* (2006.01)
(52) U.S. Cl. .............. 711/112; 711/156; 369/47.22
(58) Field of Classification Search ............ 711/170, 711/169, 118, 112, 154, 156; 369/47.22, 369/47.14, 53.31, 47.27, 100
See application file for complete search history.

(56) References Cited

U.S. PATENT DOCUMENTS

| | | |
|---|---|---|
| 4,558,446 A | 12/1985 | Banba et al. |
| 4,733,386 A | 3/1988 | Shimoi et al. |
| 4,807,205 A | 2/1989 | Picard et al. |
| 4,963,866 A | 10/1990 | Duncan |
| 5,068,842 A | 11/1991 | Naito et al. |
| 5,111,444 A | 5/1992 | Fukushima et al. |
| 5,210,734 A | 5/1993 | Sakurai et al. |
| 5,235,585 A | 8/1993 | Bish et al. |
| 5,237,553 A | 8/1993 | Fukushima et al. |
| 5,247,494 A | 9/1993 | Ohno et al. |
| 5,319,626 A | 6/1994 | Ozaki et al. |
| 5,404,357 A | 4/1995 | Ito et al. |
| 5,442,611 A | 8/1995 | Hosaka et al. |
| 5,448,728 A | 9/1995 | Takano et al. |
| 5,475,820 A | 12/1995 | Natrasevschi et al. |
| 5,481,519 A | 1/1996 | Hosoya et al. |
| 5,495,466 A | 2/1996 | Dohmeier et al. |
| 5,528,571 A | 6/1996 | Funahashi et al. |
| 5,553,045 A | 9/1996 | Obata et al. |
| 5,577,194 A | 11/1996 | Wells et al. |

(Continued)

FOREIGN PATENT DOCUMENTS

CN    1134017 A    10/1996

(Continued)

OTHER PUBLICATIONS

JIS handbook data processing for hardware, Japan, Japanese Standards Association Inc., Apr. 21, 1999, pp. 1064-1070.

*Primary Examiner*—Pierre-Michel Bataille
(74) *Attorney, Agent, or Firm*—Birch, Stewart, Kolasch & Birch, LLP

(57) ABSTRACT

A write-once optical disc and a method and apparatus for recording management information of the write-once optical disc, are provided. The method includes closing an opened session by closing all opened sequential recording-units of the opened session, opening a new session having a new sequential recording-unit, and recording session start information on the recording medium. The session start information indicates whether or not the new sequential recording-unit is a start of the new session.

45 Claims, 23 Drawing Sheets

* DMA : Disc Management Area
* TDMA : Temporary DMA
* ISA : Inner Spare Area
* OSA : Outer Spare Area
* TDFL : Temporary Defect List
* TDDS : Temporary Disc Definition Structure
* SRR : Sequential Recording Range
* SRRI : SRR Imformation

U.S. PATENT DOCUMENTS

| | | |
|---|---|---|
| 5,608,715 A | 3/1997 | Yokogawa et al. |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori et al. |
| 5,802,028 A | 9/1998 | Igarashi et al. |
| 5,805,536 A | 9/1998 | Gage et al. |
| 5,848,038 A | 12/1998 | Igarashi et al. |
| 5,867,455 A | 2/1999 | Miyamoto et al. |
| 5,878,020 A | 3/1999 | Takahashi et al. |
| 5,914,928 A | 6/1999 | Takahashi et al. |
| 5,940,702 A | 8/1999 | Sakao et al. |
| 6,058,085 A | 5/2000 | Obata et al. |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma et al. |
| 6,341,278 B1 | 1/2002 | Yamamoto et al. |
| 6,373,800 B1 | 4/2002 | Takahashi et al. |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko et al. |
| 6,469,978 B1 | 10/2002 | Ohata et al. |
| 6,477,126 B1 | 11/2002 | Park et al. |
| 6,480,446 B1 | 11/2002 | Ko et al. |
| 6,493,301 B1 | 12/2002 | Park et al. |
| 6,496,807 B1 | 12/2002 | Inokuchi et al. |
| 6,529,458 B1 | 3/2003 | Shin et al. |
| 6,542,450 B1 | 4/2003 | Park et al. |
| 6,564,345 B1 | 5/2003 | Kim et al. |
| 6,581,167 B1 | 6/2003 | Gotoh et al. |
| 6,606,285 B1 | 8/2003 | Ijtsma et al. |
| 6,615,363 B1 | 9/2003 | Fukasawa et al. |
| 6,631,106 B1 | 10/2003 | Numata et al. |
| 6,633,724 B1 | 10/2003 | Hasegawa et al. |
| 6,667,939 B1 | 12/2003 | Miyamoto et al. |
| 6,671,249 B2 | 12/2003 | Horie et al. |
| 6,697,306 B2 | 2/2004 | Sako et al. |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama et al. |
| 6,766,418 B1 | 7/2004 | Alexander et al. |
| 6,785,206 B1 | 8/2004 | Lee et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki et al. |
| 6,934,236 B2 | 8/2005 | Lee et al. |
| 6,999,398 B2 | 2/2006 | Yamamoto et al. |
| 7,002,882 B2 | 2/2006 | Takahashi et al. |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 * | 5/2006 | Sasaki et al. .................. 386/95 |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,349,301 B2 | 3/2008 | Terada et al. |
| 7,379,402 B2 | 5/2008 | Ko et al. |
| 2001/0009537 A1 | 7/2001 | Park |
| 2001/0011267 A1 | 8/2001 | Kihara et al. |
| 2001/0026511 A1 | 10/2001 | Ueda et al. |
| 2001/0043525 A1 | 11/2001 | Ito et al. |
| 2002/0025138 A1 | 2/2002 | Isobe et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 * | 10/2002 | Tol et al. .................. 707/100 |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0142608 A1 | 7/2003 | Yamamoto et al. |
| 2003/0149918 A1 | 8/2003 | Takaichi |
| 2003/0173669 A1 | 9/2003 | Shau |
| 2003/0198155 A1 | 10/2003 | Go et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0076096 A1 | 4/2004 | Hwang et al. |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0193946 A1 | 9/2004 | Park et al. |
| 2004/0223427 A1 | 11/2004 | Kim et al. |
| 2004/0246851 A1 | 12/2004 | Hwang et al. |
| 2005/0007910 A1 | 1/2005 | Ito et al. |
| 2005/0008346 A1 | 1/2005 | Noguchi et al. |
| 2005/0025007 A1 | 2/2005 | Park |
| 2005/0047294 A1 | 3/2005 | Park |
| 2005/0050402 A1 | 3/2005 | Koda et al. |
| 2005/0052972 A1 | 3/2005 | Park |
| 2005/0052973 A1 | 3/2005 | Park |
| 2005/0055500 A1 | 3/2005 | Park |
| 2005/0060489 A1 | 3/2005 | Park |
| 2005/0068877 A1 | 3/2005 | Yeo |
| 2005/0083740 A1 | 4/2005 | Kobayashi |
| 2005/0083767 A1 | 4/2005 | Terada et al. |
| 2005/0083830 A1 | 4/2005 | Martens et al. |
| 2005/0195716 A1 | 9/2005 | Ko et al. |
| 2005/0207262 A1 | 9/2005 | Terada et al. |
| 2005/0289389 A1 | 12/2005 | Yamagami et al. |
| 2006/0077827 A1 | 4/2006 | Takahashi |
| 2006/0195719 A1 | 8/2006 | Ueda et al. |
| 2006/0203635 A1 | 9/2006 | Ko et al. |

| | | | |
|---|---|---|---|
| 2006/0203638 A1 | 9/2006 | Ko et al. | |
| 2006/0203684 A1 | 9/2006 | Ko et al. | |
| 2006/0227694 A1* | 10/2006 | Woerlee et al. | 369/275.1 |
| 2007/0294571 A1 | 12/2007 | Park et al. | |
| 2008/0046780 A1 | 2/2008 | Shibuya et al. | |

FOREIGN PATENT DOCUMENTS

| | | |
|---|---|---|
| CN | 1140897 C | 1/1997 |
| CN | 1227950 A | 9/1999 |
| CN | 1273419 A | 11/2000 |
| CN | 1675708 A | 9/2005 |
| CN | 1685426 A | 10/2005 |
| DE | 199 54 054 A1 | 6/2000 |
| EP | 0314186 A2 | 5/1989 |
| EP | 0325823 A1 | 8/1989 |
| EP | 0350920 A2 | 1/1990 |
| EP | 0464811 A2 | 1/1992 |
| EP | 0472484 A2 | 2/1992 |
| EP | 0477503 A2 | 4/1992 |
| EP | 0556046 A1 | 8/1993 |
| EP | 0871172 A2 | 10/1998 |
| EP | 0908882 A2 | 4/1999 |
| EP | 0974967 A1 | 1/2000 |
| EP | 0989554 A1 | 3/2000 |
| EP | 0997904 A1 | 5/2000 |
| EP | 1026681 B1 | 8/2000 |
| EP | 1043723 A1 | 10/2000 |
| EP | 1132914 A2 | 9/2001 |
| EP | 1148493 A2 | 10/2001 |
| EP | 1152414 A2 | 11/2001 |
| EP | 1239478 A1 | 9/2002 |
| EP | 1274081 A2 | 1/2003 |
| EP | 1298659 A1 | 4/2003 |
| EP | 1329888 A1 | 7/2003 |
| EP | 1347452 A2 | 9/2003 |
| EP | 1547065 A0 | 6/2005 |
| EP | 1564740 A1 | 8/2005 |
| EP | 1573723 A0 | 9/2005 |
| EP | 1612790 A1 | 1/2006 |
| EP | 1623422 A0 | 2/2006 |
| GB | 2356735 A | 5/2001 |
| JP | 63-091842 A | 4/1988 |
| JP | 01-263955 A | 10/1989 |
| JP | 02-023417 A | 1/1990 |
| JP | 05-274814 A | 10/1993 |
| JP | 06-349201 A | 12/1994 |
| JP | 08-096522 A | 4/1996 |
| JP | 09-145634 A | 6/1997 |
| JP | 09-231053 A | 9/1997 |
| JP | 10-050032 A | 2/1998 |
| JP | 10-187356 | 7/1998 |
| JP | 10-187356 A | 7/1998 |
| JP | 10-187357 | 7/1998 |
| JP | 10-187358 | 7/1998 |
| JP | 10-187359 | 7/1998 |
| JP | 10-187361 A1 | 7/1998 |
| JP | 10-050005 A | 10/1998 |
| JP | 11-110888 A | 4/1999 |
| JP | 11-203792 A | 7/1999 |
| JP | 2000-090588 A | 3/2000 |
| JP | 2000-149449 A | 5/2000 |
| JP | 2000-195178 A | 7/2000 |
| JP | 2000-215612 | 8/2000 |
| JP | 2000-285607 A | 10/2000 |
| JP | 2001-023317 A | 1/2001 |
| JP | 2001-69440 A | 3/2001 |
| JP | 2001-110168 A | 4/2001 |
| JP | 2001-351334 A | 12/2001 |
| JP | 2001-357623 A | 12/2001 |
| JP | 2002-015507 A | 1/2002 |
| JP | 2002-015525 A | 1/2002 |
| JP | 2002-056619 A | 2/2002 |
| JP | 2002-215612 A | 8/2002 |
| JP | 2002-245723 A | 8/2002 |
| JP | 2002-288938 A | 10/2002 |
| JP | 2002-329321 A | 11/2002 |
| JP | 2002-352522 A | 12/2002 |
| JP | 2003-536194 A | 12/2003 |
| JP | 2004-280864 A | 10/2004 |
| JP | 2004-280865 A | 10/2004 |
| JP | 2005004912 | 1/2005 |
| JP | 2005-535993 A | 11/2005 |
| JP | 2005-538490 A | 12/2005 |
| JP | 2005-538491 A | 12/2005 |
| JP | 2006-519445 A | 8/2006 |
| KR | 1020040094301 A | 11/2004 |
| RU | 2005 103 626 | 9/2005 |
| RU | 2005 127 337 | 2/2006 |
| RU | 2005140311 | 8/2006 |
| TW | 371752 | 10/1999 |
| TW | 413805 | 12/2000 |
| WO | WO-84/00628 A1 | 2/1984 |
| WO | WO-96/30902 A1 | 10/1996 |
| WO | WO-97/22182 A1 | 6/1997 |
| WO | WO-00/54274 A1 | 9/2000 |
| WO | WO-01/22416 A1 | 3/2001 |
| WO | WO-01/93035 A2 | 12/2001 |
| WO | WO-03/007296 A1 | 1/2003 |
| WO | WO-03/025924 A1 | 3/2003 |
| WO | WO-03/079353 A1 | 9/2003 |
| WO | WO-2004/015707 A1 | 2/2004 |
| WO | WO-2004/015708 A1 | 2/2004 |
| WO | WO-2004-025648 | 3/2004 |
| WO | WO-2004-025649 | 3/2004 |
| WO | WO-2004/029668 A2 | 4/2004 |
| WO | WO-2004/029941 A1 | 4/2004 |
| WO | WO-2004/034396 A1 | 4/2004 |
| WO | WO-2004/036561 A1 | 4/2004 |
| WO | WO-2004/053872 A1 | 6/2004 |
| WO | WO-2004/053874 A1 | 6/2004 |
| WO | WO-2004/068476 A1 | 8/2004 |
| WO | WO-2004/075180 A1 | 9/2004 |
| WO | WO-2004-079631 | 9/2004 |
| WO | WO-2004/079740 A1 | 9/2004 |
| WO | WO-2004/081926 A1 | 9/2004 |
| WO | WO-2004079731 | 9/2004 |
| WO | WO-2004/093035 A1 | 10/2004 |
| WO | WO-2004/100155 A1 | 11/2004 |
| WO | WO-2004/100156 A1 | 11/2004 |
| WO | WO-2005/004123 A1 | 1/2005 |

* cited by examiner

List of SRR entries(30)

SRR entry(35)

FIG. 6C

List of opened SRRs

| Contents | number of bytes |
|---|---|
| 1st Opened SRR number | 2 |
| 2nd Opened SRR number | 2 |
| ⋮ | ⋮ |
| 16th Opened SRR number | 2 |

US 7,516,273 B2

WRITE-ONCE OPTICAL DISC AND METHOD FOR RECORDING MANAGEMENT INFORMATION THEREON

This application claims the benefit of Patent Application No. 2003-062674 filed in Republic of Korea on Sep. 8, 2003 and No. 2004-036073 filed in Republic of Korea on May 20, 2004. The entire contents of each of these applications are hereby incorporated by reference.

BACKGROUND OF THE INVENTION

1. Field of the Invention

The present invention relates to a write-once optical disc, a method for recording management information of the write-once optical disc and a method and apparatus for recording and playing back the write-once optical disc.

2. Discussion of the Related Art

As an optical recording medium, optical discs on which high-capacity data can be recorded are widely being used. Among them, a new high-density optical recording medium (HD-DVD), for example, a Blu-ray disc, has been recently developed for recording and storing high-definition video data and high-quality audio data for a long term period.

The Blu-ray disc is the next generation HD-DVD technology and the next generation optical recording solution, and has an excellent capability to store data more than the existing DVDs. Recently, a technical specification of international standard for HD-DVD has been established. Related with this, various standards for a write-once Blu-ray disc (BD-WO) are being prepared following the standards for a rewritable Blu-ray disc (BD-RE).

Among the standards for the write-once Blu-ray disc (BD-WO), a method for recording management information has been discussed. This method involves a recording method of an information indicating a recorded status of the disc, which is one of the characteristics of the write-once optical disc.

The information indicating the recorded status of the disc allows a host or a user to easily find a recordable area on the write-once optical disc. In the existing write-once optical discs, this information is named variously. For example, in the case of CD series, this information is named a track information; in the case of DVD series, this information is named an RZone or a fragment.

Accordingly, there is an increasing demand for a method of efficiently recording the management information corresponding to the recorded status of the high-density optical disc. And this method must be provided with the standardized information in order to secure mutual compatibility. In addition, there is a demand for a method of recording the management information on a disc, which can be applied to a write-once high-density optical disc performing defect management, as well as to the Blu-ray discs.

SUMMARY OF THE INVENTION

Accordingly, the present invention is directed to an optical disc and a method and apparatus for recording disc management information, and particularly to a method and apparatus for efficiently managing the disc recording status information, which substantially obviate one or more problems due to limitations and disadvantages of the related art.

An object of the present invention is to provide a write-once optical disc and a method and apparatus for defining types of sessions and sequential recording ranges (SRRs) for the disc.

Another object of the present invention is to provide a method and apparatus for recording SRR information (SRRI) as a disc recording status information that can be applied to a write-once optical disc.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6C illustrates an example of a structure of a list of opened SRRs field of an SRRI according to the present invention;

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

For the convenience of description, a write-once Blu-ray disc (BD-WO) is described for example. Most of the terminologies in this specification are widespread general words but there are some words selected and used by the inventor, the meaning of which will be described in detail in the corresponding description. The present invention should be understood not based on the simple meanings of the words but based on the specifically described meanings of the words, if such meanings have been discussed.

Figure 12:
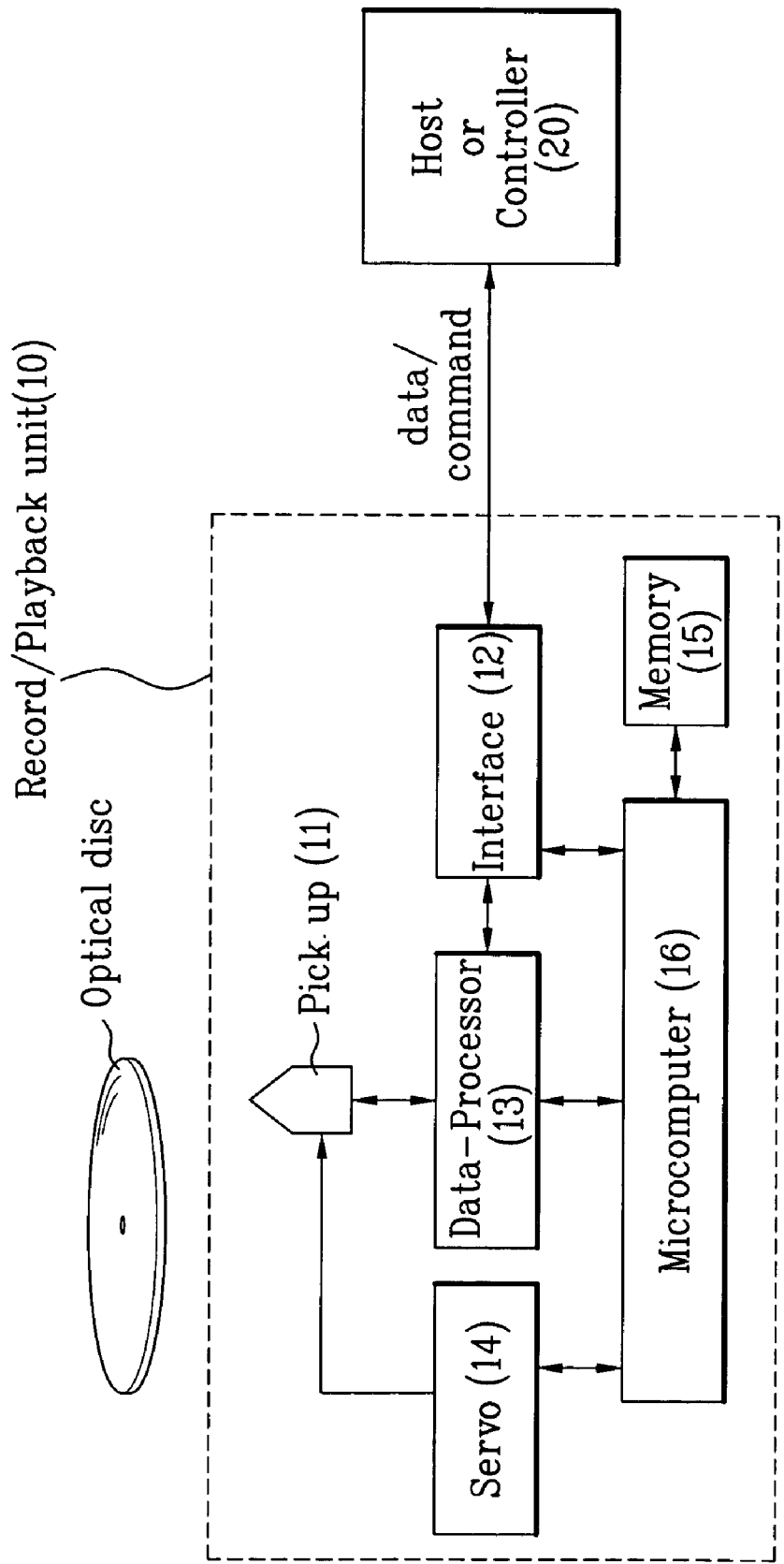
FIG. 12 illustrates a recording/playback apparatus for a write-once optical disc according to an embodiment of the present invention.

In this specification, "SRR" (sequential recording range) means an area provided to record data on a disc and is a unit of recording for sequential recording (sequential recording-unit). An SRR has a size of one or more clusters. "SRR information" (SRRI) is a name for information identifying a recording status of a disc. SRRI is applied to a sequential recording mode of the disc and pertains to one or more SRRs. "Padding" means filling an unrecorded area in an SRR with dummy data or zeros at a user's request or under control of a recording/playback apparatus (FIG. 12). "Session" is composed of one or more consecutive SRRs and identifies SRRs for compatibility to the specification only for playbacks.

Figure 1:
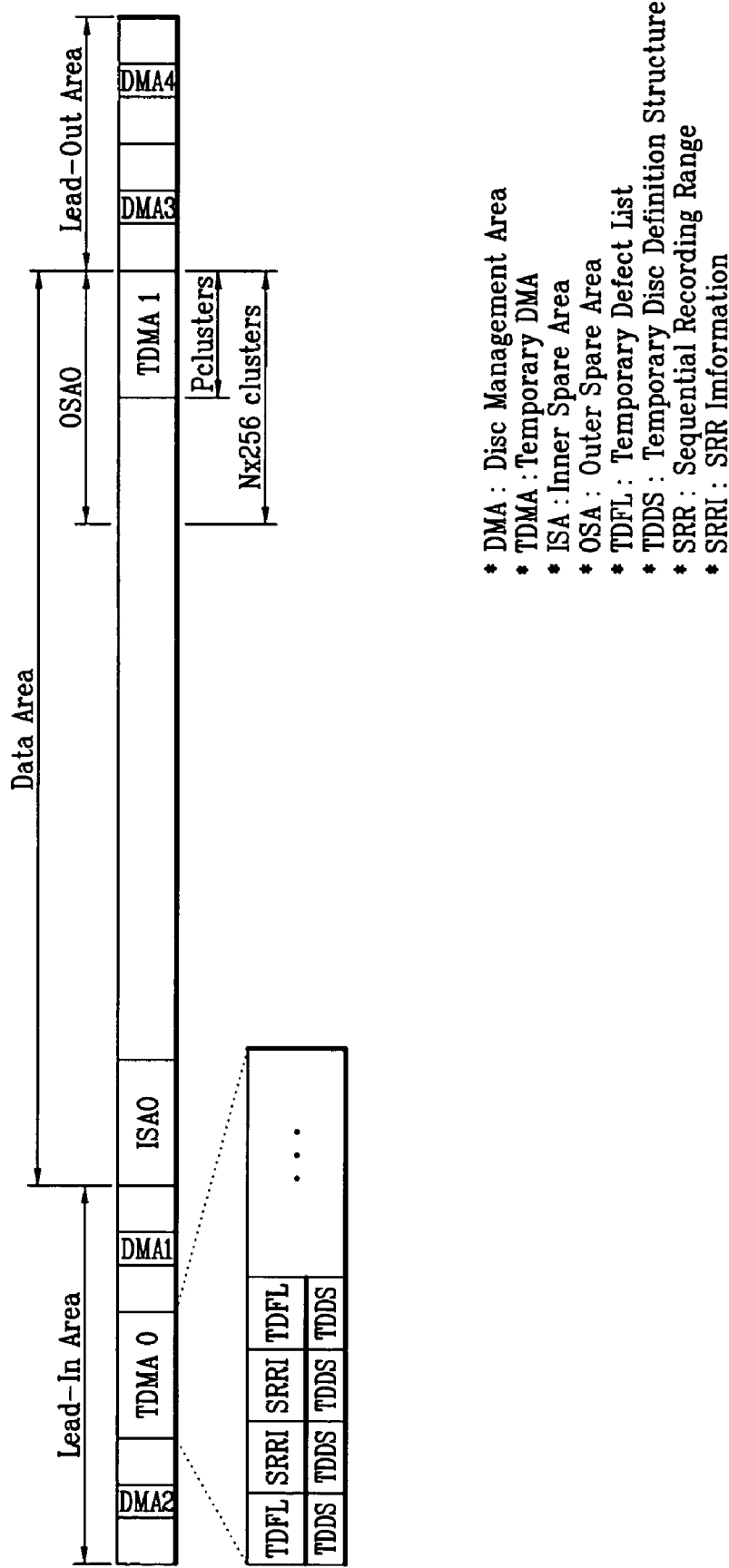
FIG. 1 illustrates an overall structure of a write-once optical disc and a method for recording management information on the write-once optical disc according to the present invention.

FIG. 1 illustrates a structure of a write-once optical disc such as a BD-WO and a method for recording disc management information according to the present invention. The disc shown in FIG. 1 has a single recording layer as an example. But the present invention is not limited to such, and is applicable to a disc having dual or multiple recording layers.

Referring to FIG. 1, the disc includes a lead-in area, a data area, and a lead-out area, all at the recording layer. The lead-in and lead-out areas have a plurality of disc (or defect) management areas (DMA1-DMA4) for storing the same defect management information repeatedly. In the data area, an inner spare area ISA0 and/or an outer spare area OSA0 for replacing defective areas is provided.

It is known that a rewritable optical disc does not have or need a large DMA since its DMA can be written and erased repeatedly, even if the disc has the DMA of a limited size. This is not the case for a write-once optical disc such as a BD-WO. Since the write-once optical disc cannot be re-recorded on the area that was recorded once, the write-once optical disc needs and has a larger management area. To more effectively store management information, in the write-once optical disc the management information is temporarily stored in a temporary disc management area (TDMA). When the disc is ready to be finalized/closed, then the management information stored in a final/latest TDMA is transferred to a DMA for more permanent storage.

As shown in FIG. 1, the disc includes two TDMAs: TDMA0 and TDMA1. The TDMA0 is allocated to the lead-in area and has a fixed, non-variable size. The TDMA1 is allocated to the outer spare area OSA0 and has a size variable in accordance with the size of the spare area. The size P of the TDMA1 may be, for example, P=(N*256)/4 clusters where N is a positive integer, which is about one fourth of the size of the entire outer spare area OSA0.

In each of the TDMA0 and TDMA1, temporary defect list (TDFL) information and temporary disc definition structure (TDDS) information together (TDFL+TDDS) can be recorded in one recording-unit (e.g., one cluster in the case of a BD-WO), or SRRI and TDDS information together (SRRI+TDDS) can be recorded in one recording-unit as shown. The SRRI is recorded when a sequential recording mode is used, whereas SBM (space bit map) is used when a random recording mode is used.

At each update time, (TDFL+TDDS) or (SRRI+TDDS) are recorded to the TDMA in the size of one cluster. In the example of FIG. 1, a TDFL and a TDDS are recorded in one cluster of the TDMA0, an SRRI and a TDDS are recorded in the next cluster of the TDMA0, an SRRI and a TDDS are recorded in the next cluster of the TDMA0, and so on.

If a defective area occurs within the data area, a process of replacing it with the spare area is carried out. The TDFL is the information that manages this process as the defect list. In the case of a single layer disc, the TDFL is recorded with the size of 1 cluster to 4 clusters according to the size of the defect list. SRRI is information informing of whether a specific area of the disc is recorded or unrecorded. The SRRI can be widely used when the disc is of a consecutive recording type. That is, the SRRI can be usefully applied to the case where the disc is recorded in a sequential or incremental recording mode. In addition, the TDDS information is generally recorded on the last sector among the 32 sectors within one cluster of the management area. Information for general management and defect management of the disc is recorded as part of the TDDS information, and the TDDS information is generally always recorded last when the management information is updated within the TDMA.

The present invention relates to a method of generating and recording disc recording status information, which is applied to a new high density optical disc such as a BD-WO. In the present invention, SRRI is used as the disc recording status information, and various types of SRRs are defined as shown in FIGS. 2A through 3E. The detailed structure of SRRI will be described referring to FIGS. 5A through 6C. The present invention also defines and distinguishes different types of SRRs formed on the disc ,and uses them to record and playback the optical disc. A method of newly defining the types of the SRRs and creating information identifying the types of distinguished SRRs will be described in detail.

FIGS. 2A to 2D illustrate different types of opened SRRs for the write-once optical disc (e.g., a BD-WO) according to the present invention. An opened SRR is an SRR in which data can be recorded. If the SRR is recordable, the SRR has "next writable address" (NWA). Accordingly, the opened SRR is the SRR having the NWA. The SRR that does not have the NWA and is not recordable is called a closed SRR. The closed SRR will be described referring to FIGS. 3A through 3E.

Figure 2A:
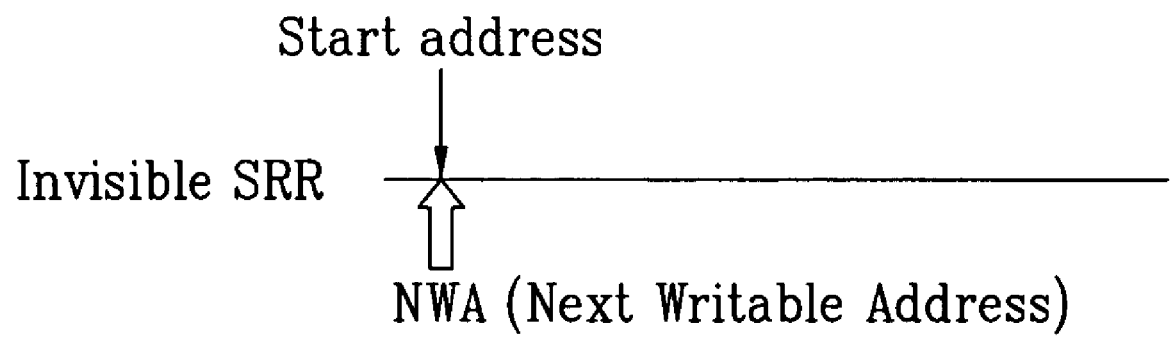
FIGS. 2A through 2D illustrate different types of opened SRRs of a write-once optical disc according to the present invention.

More specifically, FIG. 2A shows an invisible SRR that is one type of an opened SRR. The invisible SRR is generally always formed on an outermost section of a disc or an initial black disc and means an unrecorded area. In other words, only a start address of the invisible SRR is defined and an end address of the invisible SRR means an end of user data. Since data is not yet recorded, "last recorded area" (LRA) has a zero value and the NWA has the same value as the start address of the invisible SRR.

Figure 2B:
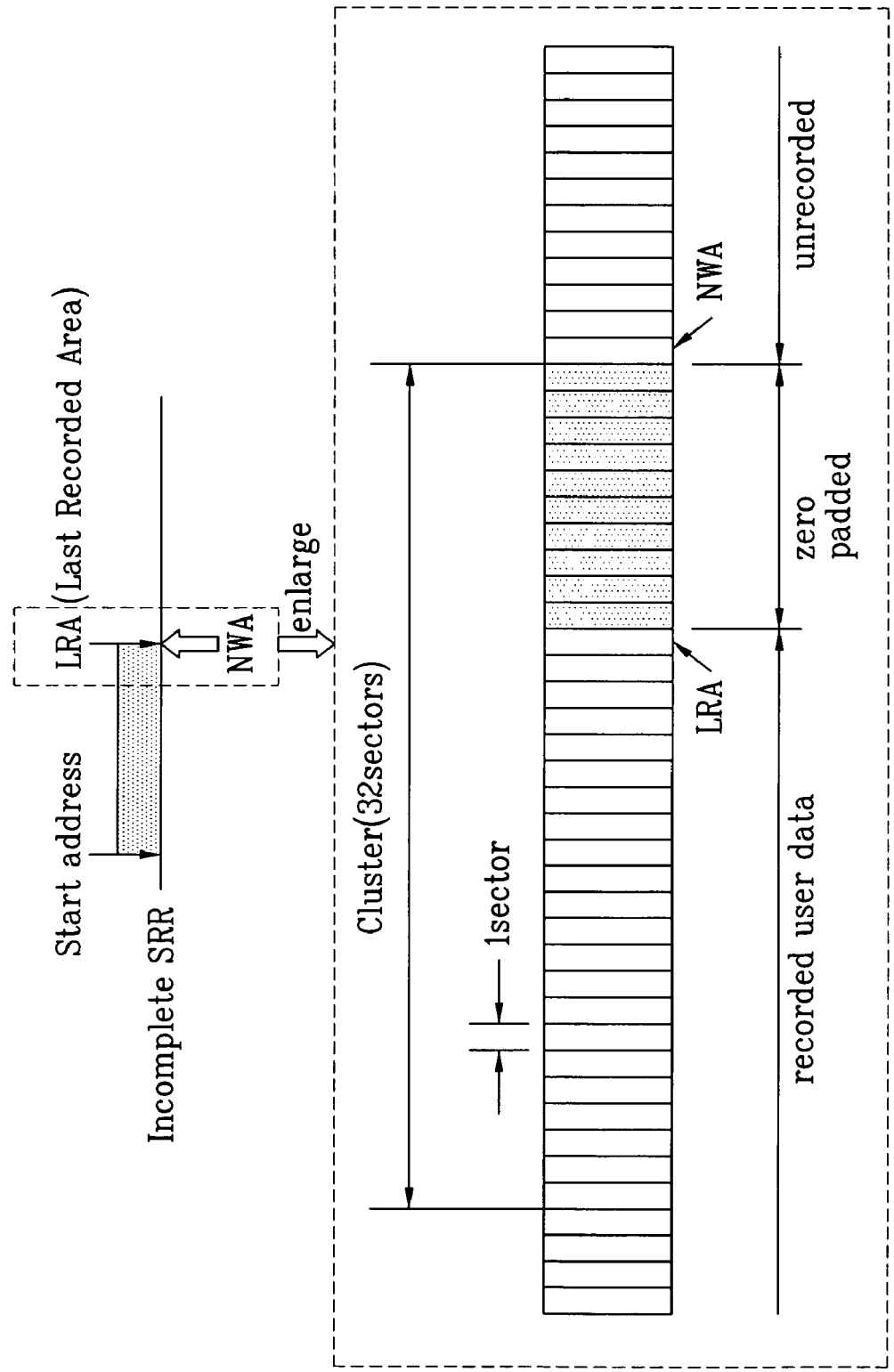

FIG. 2B shows an incomplete SRR that is another type of an opened SRR. The incomplete SRR is an SRR that is partially recorded in the invisible SRR of FIG. 2A. In other words, only a start address of the incomplete SRR is defined and an end address of the incomplete SRR means an end of user data. However, since data is partially recorded in the incomplete SRR, the LRA of the incomplete SRR represents the last address at which normal user data is recorded and the NWA is the next writable address from the LRA of the incomplete SRR. That is, the NWA is the first PSN of the next available unrecorded cluster in the related SRR.

In the opened SRR, if the SRR is partially recorded, the relation between the LRA and the NWA will be now described in detail in relation with padding shown in FIG. 2B.

The enlarged view of the small dotted box portion in FIG. 2B is provided at a lower portion of the drawing.

In other words, LRA means the area in which user data are actually recorded. If the user data are recorded on some sectors in one cluster consisting of thirty-two sectors, the physical sector number (PSN) of a last sector on which the user data are recorded is the LRA as shown in FIG. 2B. However, since the basic recording-unit of the Blu-ray disc is a cluster, NWA representing an additionally recordable area will be the PSN of a header sector of the following cluster. Accordingly, if data is recorded on some sectors of the cluster and recording is finished (i.e., the sequential recording is terminated), the remaining unrecorded sectors are padded with dummy data according to the present invention. For instance, the remaining unrecorded sectors of the cluster are padded with zeros as shown. If all the user data are recorded on even the last sector of the cluster, it is obvious that the padding described is not necessary.

Figure 2C:
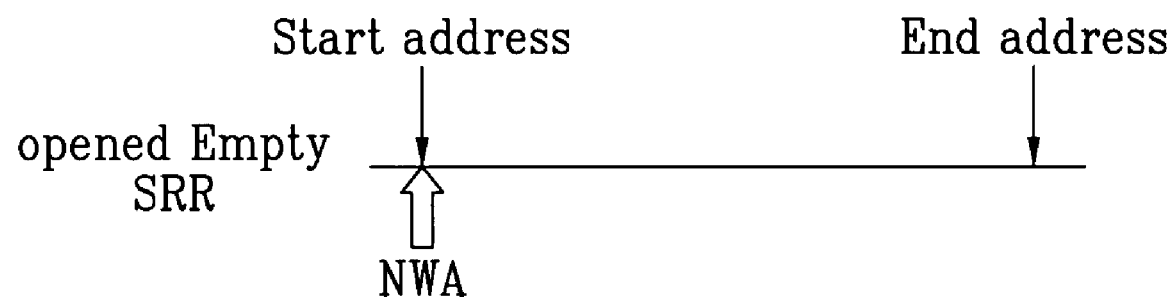

FIG. 2C shows an empty SRR that is yet another type of an opened SRR. The empty SRR is formed generally not at an outermost section of the disc, but is formed generally at a middle section to record data in contrast to the invisible SRR and the incomplete SRR of FIGS. 2A and 2B. In other words, it is the case where a host or user makes an SRR, but does not yet record data on the SRR. Since the empty SRR has a start address and an end address but is not yet recorded, the LRA of the empty SRR has a "zero" value and the NWA has the same value as the start address of the empty SRR.

Figure 2D:
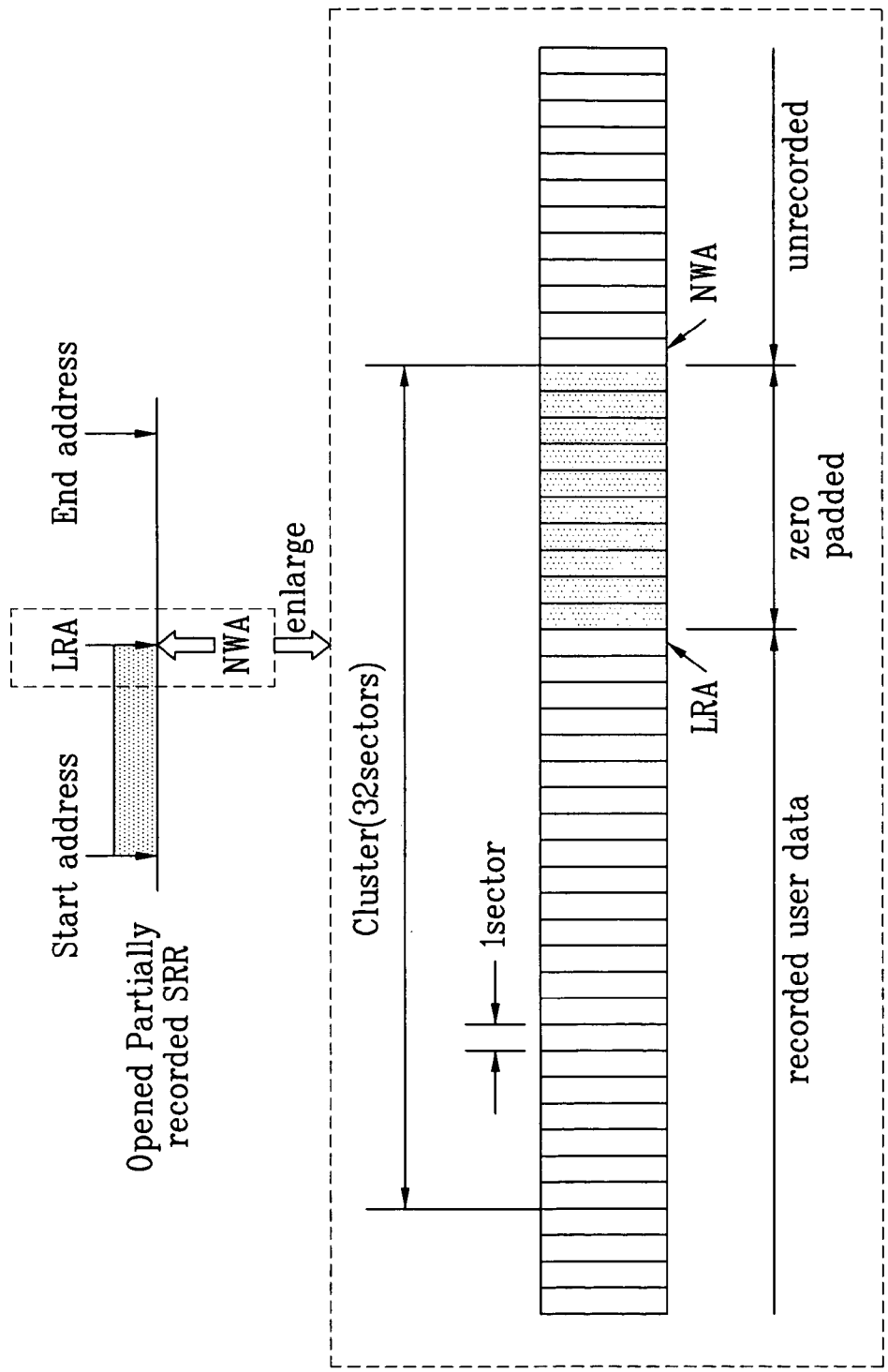

FIG. 2D shows a partially recorded SRR that is yet another type of an opened SRR. The partially recorded SRR is an SRR that is partially recorded in the empty SRR of FIG. 2C. Accordingly, the partially recorded SRR has a start address and an end address. Since data is partially recorded in the partially recorded SRR, the LRA of the partially recorded SRR represents the last address at which normal data is recorded and the NWA is the next writable address from the LRA.

In the opened SRR of FIG. 2D, if the SRR is partially recorded, the enlarged view of the small dotted portion in FIG. 2D shows the relation between the LRA and NWA in relation with padding. The detailed description on this feature is omitted since it is the same as the description of FIG. 2B.

Accordingly, referring to FIGS. 2A through 2D, the opened SRRs of the present invention are classified into the unrecorded opened SRRs (FIGS. 2A and 2C) and the partially recorded opened SRRs (FIGS. 2B and 2D). The partially recorded opened SRRs (FIGS. 2B and 2D) can be classified into an opened SRR padded after the LRA, and an unpadded opened SRR.

According to the present invention, the total number of opened SRRs at any given time is limited to a predetermined number in the write-once optical disc due to a difficulty in management if the number of opened SRRs is large. For example, the total number of the opened SRRs on the disc may be sixteen at most in the BD-WO of the present invention. The information on the location and the number of the opened SRRs can be referred to using a "list of opened SRRs" field and a "number of opened SRRs" field in a header of the SRRI. The "list of opened SRRs" field and the "number of opened SRRs" field in the SRRI header will be described later when the SRRI structure is discussed referring to FIGS. 5 through 6C.

FIGS. 3A to 3E illustrate different types of closed SRRs for a write-once optical disc'such as a BD-WO according to the present invention. A closed SRR is an SRR in which data (e.g., user data) cannot be recorded. If the SRR is not recordable, the SRR does not have a NWA. The closed SRR may be created because the SRR is fully recorded. Also, the closed SRR may be created because a user or host closes the SRR by a close command even though a recordable area remains in the SRR.

Figure 3A:
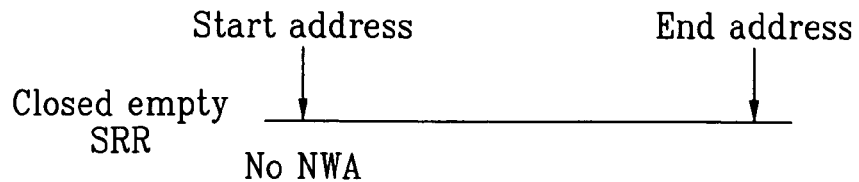
FIGS. 3A through 3E illustrate different types of closed SRRs of a write-once optical disc according to the present invention.

Particularly, FIG. 3A shows an empty SRR that is one type of a closed SRR. The empty SRR is an opened empty SRR (FIG. 2C) that is closed by a close command without any user-data recording thereto. Accordingly, FIG. 3A shows a closed empty SRR and FIG. 2C shows an opened empty SRR.

Figure 3B:
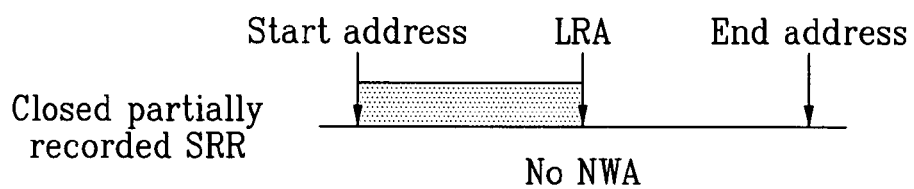

FIG. 3B shows a partially recorded SRR that is another type of a closed SRR. The partially recorded SRR of FIG. 3B is the opened partially recorded SRR of FIG. 2D that is closed by a close command without any additional user-data recording thereto. Accordingly, FIG. 3B shows a closed partially recorded SRR and FIG. 2D shows an opened partially recorded SRR.

Figure 3C:
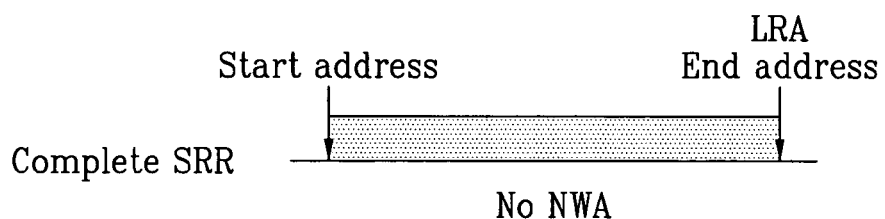

FIG. 3C shows a complete SRR that is yet another type of a closed SRR. The complete SRR is an SRR in which user data are recorded fully in the SRR, or which is padded fully with dummy data. The complete SRR exists only among the closed SRRs.

Figure 3D:
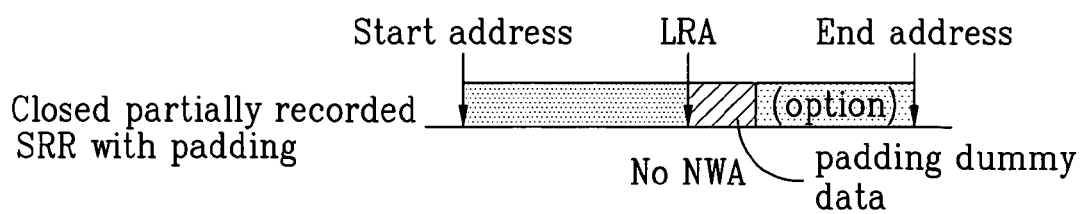

FIG. 3D shows a closed partially recorded SRR that is yet another type of a closed SRR. The partially recorded SRR of FIG. 3D is an SRR that is padded with dummy data in a recordable area after its LRA when closing the opened partially recorded SRR of FIG. 2D. Herein, all the recordable areas or only some recordable areas (for example, one or more clusters) of the SRR after its LRA or NWA may be padded with dummy data used as padding data. In addition, when some areas are padded, a specific character code such as ASCII characters may be recorded as the padding data, instead of recording the dummy data so as to represent that the SRR is closed. In this case, the specific character code to be used as the padding data can be characters such as "CLSD" representing that a corresponding SRR is closed.

Figure 3E:
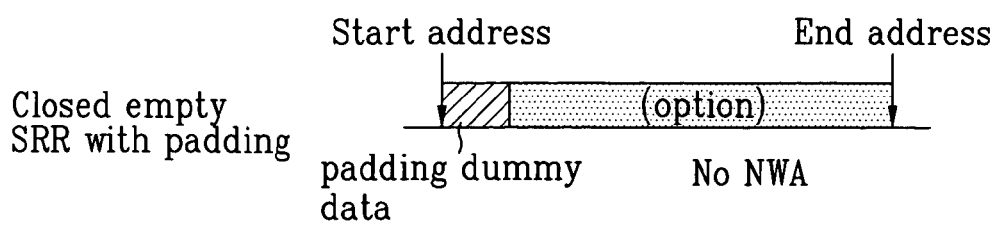

FIG. 3E shows an empty SRR that is another type of a closed SRR. The empty SRR of FIG. 3E is an SRR that is padded with specific dummy data in a recordable area after its LRA and then closed when closing the opened empty SRR of FIG. 2C. Herein, all the recordable areas or only some recordable areas (for example, one or more clusters) of the SRR after its LRA or NWA may be padded with dummy data used as padding data. In addition, when some areas are padded, a specific character code such as ASCII characters may be recorded as the padding data, instead of recording the dummy data so as to represent that the SRR is closed. In this case, the specific character code to be used as the padding data can be characters such as "CLSD" representing that a corresponding SRR is closed.

If the closed SRRs of FIGS. 3D and 3E are fully padded with dummy data up to the end address, the closed SRRs of FIGS. 3D and 3E are the same SRRs as the complete SRR described above referring to FIG. 3C. In other words, in the present invention, in determining the type of the closed SRR, the closed SRRs are defined to distinguish the case of closing the unrecorded remaining area(s) of the SRR without padding (FIGS. 3A and 3B) from the case of padding and closing the unrecorded remaining area(s) of the SRR (FIGS. 3D and 3E) when the opened SRR is changed into the closed SRR by a close command.

Additionally, in the present invention, when closing an SRR, it is possible to close the SRR without padding or to close the SRR after padding with specific padding data. It is considered that the Blu-ray disc is compatible to a disc only for playback in the same family though SRRs or if unrecorded areas are padded. A recording/playback apparatus (e.g., as shown in FIG. 12) can selectively pad the disc so that the freedom of the design of the recording/playback apparatus is further ensured. When padding the disc, a recording/playback part (e.g., the component 10 in FIG. 12) of the recording/playback apparatus can automatically record specific data, so that the component 10 receives specific data from a controller 20 and can solve the time problem in the case of padding.

Figure 4A:
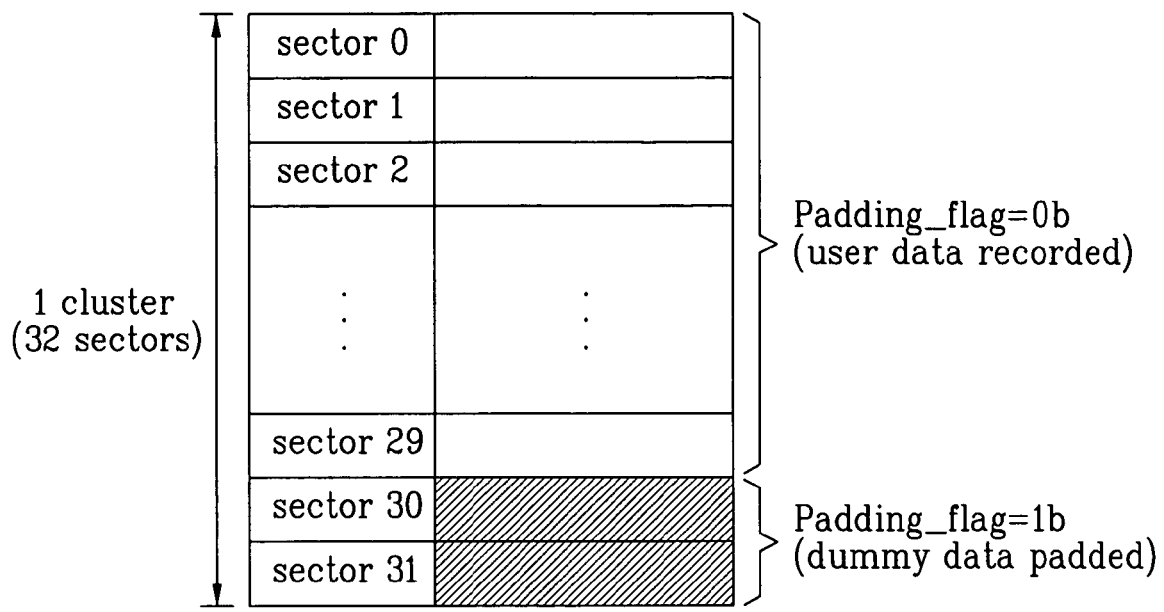
FIG. 4A illustrates an example of padding identification information when padding dummy data to a closed SRR of a write-once optical disc according to the present invention.
Figure 4B:
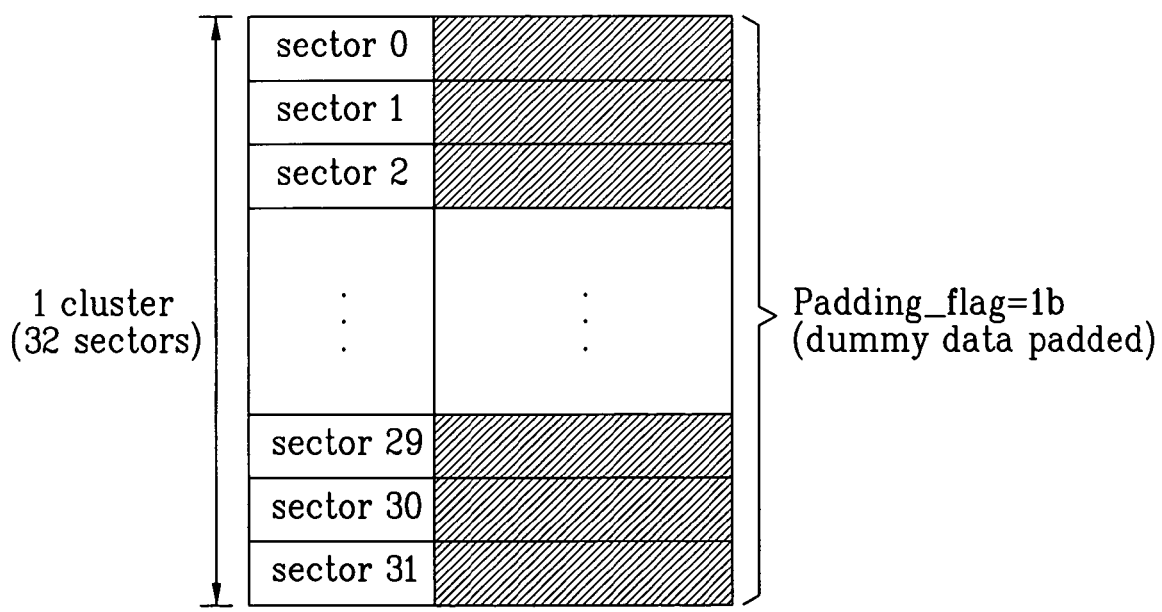
FIG. 4B illustrates an example of padding identification information when padding dummy data to an opened SRR of a write-once optical disc according to the present invention.

FIGS. 4A and 4B illustrate examples of padding identification information when padding dummy data respectively to a closed SRR and an opened SRR of a write-once optical disc according to an embodiment of the present invention. The padding may be performed to an opened SRR when closing the opened SRR. But it can also be performed to an opened SRR in response to a command not necessarily to close the SRR (e.g., in the cases of FIGS. 2B and 2D). That is, FIG. 4A is related to FIG. 2B or 2D, and FIG. 4B is related to FIG. 3D or 3E.

More specifically, FIG. 4A shows a case where the actual user data is recorded on only some areas of one cluster and the remaining areas of the cluster are padded with dummy data in the case of an opened SRR. FIG. 4A shows that padding identification information "Padding_flag" for distinguishing a sector in which actual user data is recorded from a sector padded with dummy data is set as control data in the corresponding cluster. There exist 32 Padding_flags each corresponding to one of the 32 sectors of the cluster.

As shown in FIG. 4A, in this example, since sector 0-sector 29 are the areas in which user data are recorded, the Padding_flag for each of these sectors is set to a certain value, e.g., "0b," so as to indicate that no padding is present to the corresponding sector. On the other hand, since sector 30 and sector 31 are the areas padded with padding data, the Padding_flag for each of these sectors is set to a value such as "1b" so as to indicate that padding is present in the corresponding sectors.

In this example, the LRA represents the location (first PSN) of sector 29. Accordingly, the optical recording/playback apparatus can decode a cluster including the LRA, read the Padding_flag corresponding to each of the sectors and then distinguish accurately a sector on which user data is recorded from a sector padded with dummy data in the cluster.

FIG. 4B shows that a specific cluster of the recordable areas in an SRR is fully padded with dummy data in the case of closing the SRR. FIG. 4B shows that padding identification information "Padding_flag" for distinguishing an SRR closed without padding from an SRR closed after padding is set as control flag in the corresponding cluster.

As shown in FIG. 4B, in this example, since sector 0-sector 31 are the areas padded fully with dummy data, the Padding_flag is set to a certain value such as "1b" for all the sectors. Consequently, the optical recording/playback apparatus can decode a cluster having the padding identification information (Padding_flag) as described above, read the Padding_flag corresponding to each of the sectors and then accurately recognize that all sectors in the cluster are padded with dummy data.

In other words, FIG. 4A relates to padding for terminating the sequential recording on the disc whereas FIG. 4B relates to padding for closing an SRR. FIG. 4A shows that all the remaining sectors in the related cluster are padded with dummy data when the sequential recording is terminated. Each padding flag corresponds to each sector of the cluster, and is set to "1b" if the corresponding sector is padded. In the case of FIG. 4A, padding occurs one sector at a time. On the other hand, in the case of FIG. 4B, one or more clusters (one cluster at a time) are padded when closing the SRR. For one cluster padding, 32 padding flags corresponding to 32 sectors of that cluster are all set to "1b" to indicate the padding of that cluster as shown in FIG. 4B.

Figure 4C:
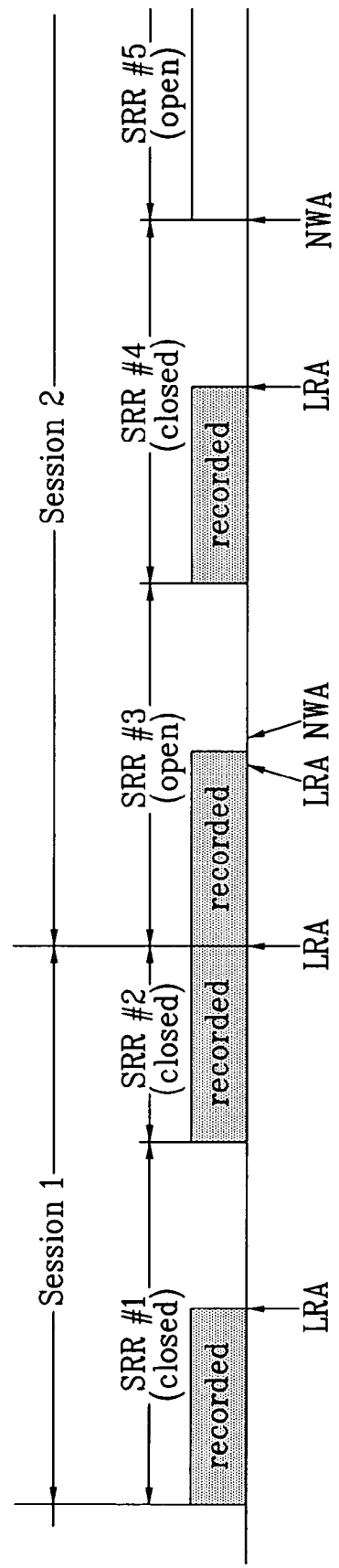
FIG. 4C illustrates an example of a session of a write-once optical disc according to the present invention.

FIG. 4C illustrates an example of a session of the write-once optical disc according to an embodiment of the present invention. A "session" is an upper-level recording-unit compared to the lower-level recording-unit such as an SRR, and includes at least one SRR. A plurality of sessions can be recorded on the disc and such a disc is called a multi-session disc. Referring to FIG. 4C, the concept of the session of the present invention will be now described.

First, a plurality of sessions of the present invention can be allocated from the inner track of the disc toward the outer track direction of the disc, and the session numbers are given sequentially to such sessions. Even if a plurality of sessions exist, there may be only one opened session on the disc at a given time. This opened session is the session whose session number is the highest among the existing sessions. In other words, the session formed on the outermost track at a given time is a recordable session and is called the opened session. When the recording is finished or a close command is received, then the currently opened session is closed into a closed session. All the SRRs in the closed session should be closed also into closed SRRs. Herein, if the session to be closed includes an invisible SRR, the corresponding invisible SRR is excluded from being closed and only the remaining SRR is closed. The excluded invisible SRR is then formed as a new open session. In FIG. 4C, a session #1 represents a closed session and a session #2 represents an opened session as an example. The session #1 is composed of an SRR #1 and an SRR #2, whereas the session #2 is composed of an SRR #3, an SRR #4, an SRR #5, etc.

When the session is closed and also the SRR is closed, the SRR can be closed after padding or without padding as described above. Identification on whether the padding is present is identified by "Padding_flag". When an incomplete SRR is closed, only a recoded area of the SRR is closed and an unrecorded area of the SRR is changed into an invisible SRR forming a new opened session.

There is no special buffer zone between a session and another adjacent session. Instead, a "session-start bit" in the SRRI is provided to indicate whether or not the corresponding SRR is the start of the session. The session start bit will be described later in detail when the SRRI structure is described. Additionally, although a plurality of SRRs can exist in the opened session (the session #2 of FIG. 4C, for example), all the SRRs of that session do not have to be opened SRRs and it is sufficient that at least one opened SRR exists in the opened session. In FIG. 4C, the SRRs #3 and #5 in the opened session #2 are opened SRRs and the SRR #4 is a closed SRR.

Figure 5:
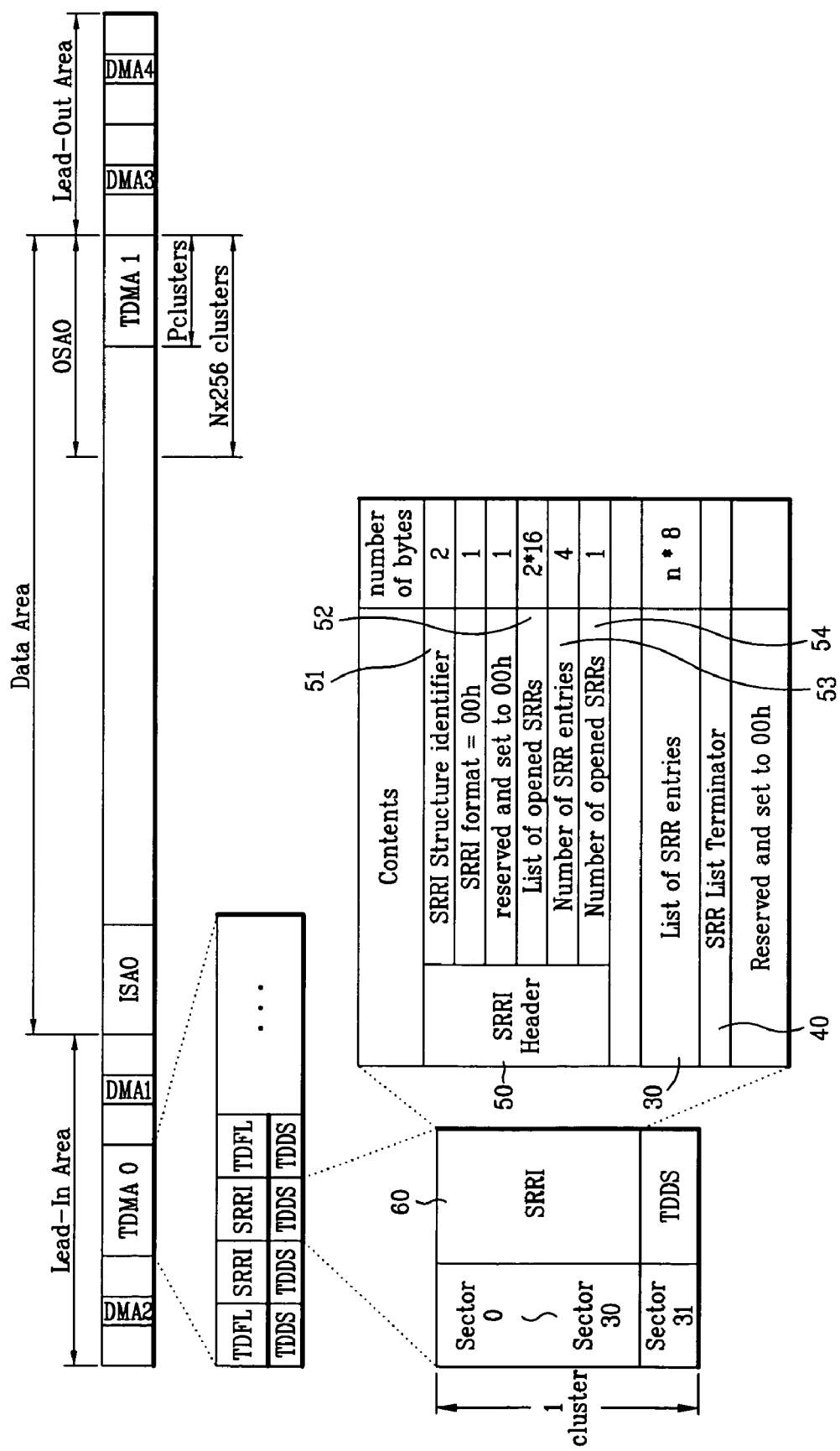
FIG. 5 illustrates an overall structure of a write-once optical disc and a method for recording SRRI as disc management information according to the present invention.

FIGS. 5 through 6C illustrate a structure of SRRI and information included in the SRRI according to the present invention.

Particularly, FIG. 5 illustrates the overall structure of an SRRI. The SRRI pertains to one or more SRRs and is management information providing disc recording status. The SRRIs are recorded in TDMA(s) (e.g., the TDMA0) in the optical disc structure of FIGS. 1 and 5. As shown in FIG. 5, each SRRI 60 in a TDMA is composed of three parts: a header 50, a list of SRR entries 30 and an SRR list terminator 40. The header 50 identifies the SRRI. The list of SRR entries 30 represents the recording status of each of the corresponding SRRs. The SRR list terminator 40 represents an end or termination of the SRRI.

The header 50 is located at a header in the SRRI and includes an "SRRI structure identifier" field 51, a "List of opened SRRs" field 52, a "Number of SRR entries" field 53 and a "Number of opened SRRs" field 54, so that the overall SRR entry contents can be checked before the SRR entry list is read. Herein, the "SRRI structure identifier" field 51 identifies the SRRI. The "List of opened SRRs" field 52 informs of the location (identification) of the opened SRRs associated with the corresponding SRRI and will be described later in more detail referring to FIG. 6C. The "Number of SRR entries" field 53 represents the total number of all SRRs associated with the SRRI 60. The "Number of opened SRRs" field 54 represents the total number of opened SRRs.

After the header 50, the list of SRR entries (or the SRR entry list) 50 is recorded in the SRRI. After the last SRR entry, the end of the SRRI is marked with the SRR list terminator 40. The SRR list terminator 40 is meaningful as information indicating an end location of the corresponding SRRI if the SRRI has a variable size.

Accordingly, as disc management information, the SRRI is composed of the header 50, the SRR entry list 30 and the SRR list terminator 40. All such information is recorded in batch whenever it is updated.

Figures 6A, 6B:
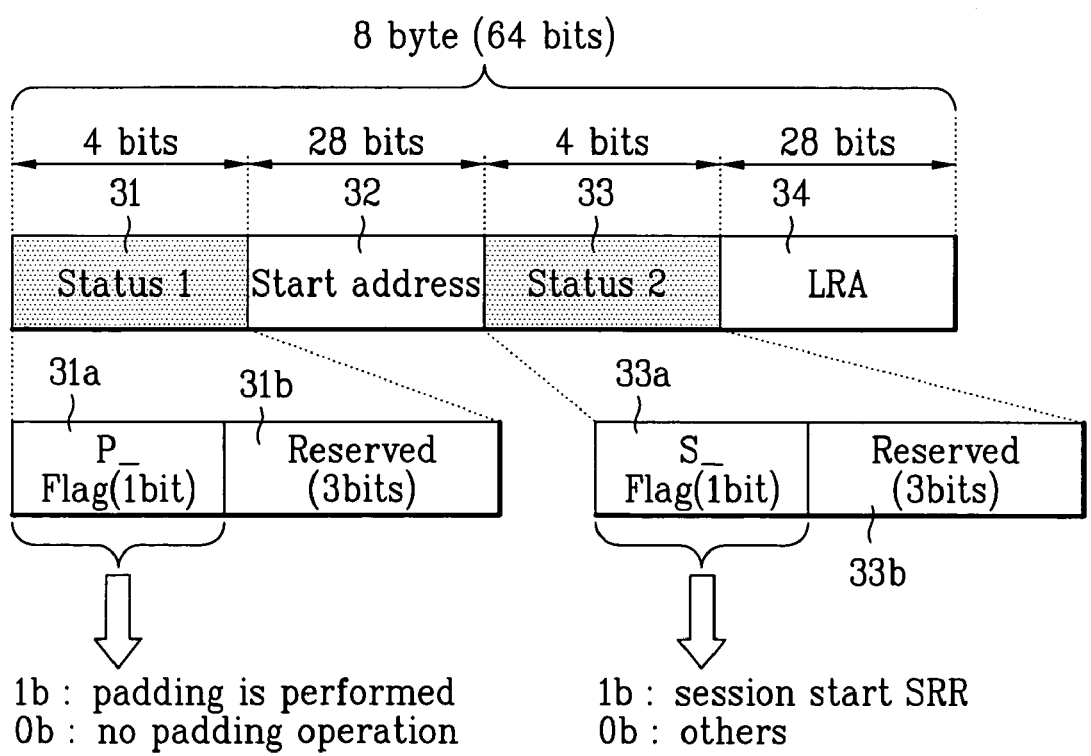
FIG. 6A illustrates a structure of an SRR entry list recorded in an SRRI according to the present invention.
FIG. 6B illustrates an example of an SRR entry recorded in the SRR entry list of FIG. 6A according to the present invention.

FIG. 6A illustrates an example of the SRR entry list 30 recorded in an SRRI according to the present invention. As shown in FIG. 6A, the SRR entry list 30 is composed of one or more SRR entries 35. Each of the SRR entries 35 carries information on one SRR (identified by the SRR number) on the disc, has a size of eight bytes (64 bits) and represents the recording status of the corresponding SRR. Each SRR entry 35 includes a status field 31 (Status 1) for storing the status of the corresponding SRR, a start address field 32 for storing a start address of the corresponding SRR, another status field 33 (Status 2) for storing the status of the corresponding SRR, and a last recorded address (LRA) field 34 for storing the LRA of the corresponding SRR (i.e., the end address of the user data stored in the SRR). Generally, the start address of the corresponding SRR in the start address field 32 is represented as a physical sector number (PSN).

According to an embodiment, the first 4 most significant bits (b63-b60) among the 64 bits of the SRR entry 35 are allocated to the first status field 31, the next 28 bits (b59-b32) of the SRR entry 35 are allocated to the start address field 32, the next 4 bits (b31-b28) of the SRR entry 35 are allocated to the second status field 33, and the last 28 bits (b27-b0) of the SRR entry 35 are allocated to the LRA field 34.

FIG. 6B illustrates an example of the SRR entry 35 recorded in the SRR entry list 30 according to the present invention. The Status 1 field 31 is used to store information identifying whether or not any padding is performed in the corresponding SRR. The Status 2 field 33 is used to store information identifying whether or not the corresponding SRR is the start of a session.

As shown in FIG. 6B, out of the 4 heading bits allocated to the Status 1 field 31, one bit is used to store a padding identification information "P_flag" identifying whether or not the padding is present. The other three bits of the 4 heading bits are reserved for any change of regulation.

It should be noted that the padding identification information "P_flag" recorded in the SRR entry is similar to the padding identification information "Padding_flag" described referring to FIGS. 4A and 4B. However, they have different objects. If a specific SRR is finally padded, the P_flag is recorded in the SRR entry to directly represent that the corresponding SRR is a padded SRR. Accordingly, the optical recording/playback apparatus (FIG. 12) can easily check whether or not the corresponding SRR is padded by examining the P_flag recorded as management information in the SRR entry. After that, the optical recording/playback apparatus decodes the corresponding cluster (SRR) described above referring to FIGS. 4A and 4B and reads from the cluster the value of the Padding_flag corresponding to each sector of the SRR, so that the optical recording/playback apparatus is able to determine how much of the SRR is padded after its LRA.

In the example of FIG. 6B, the first bit (31*a*) of the Status 1 field 31 carries the P-flag and the remaining 3 bits (31*b*) of the field 31 are reserved. If P_flag=1b, it means that the corresponding SRR is a padded SRR (i.e., the SRR has at least some portion that is padded with padding data). If P_flag =0b, it means that the corresponding SRR is an unpadded SRR.

The Status 2 field 33, which is allocated with 4 bits, carries information on whether or not the corresponding SRR is the session start SRR. One bit of the four-bit field 33 carries a session identification information "S_flag" identifying whether or not the corresponding SRR is a start SRR of a session. The other three bits of the field 33 are reserved for any change of regulation. In other words, the S_flag is the above-mentioned "session start bit". In the example, the first bit (33*a*) of the four-bit field 33 stores the S-flag and the remaining 3 bits (33*b*) are reserved. If S_flag=1b, it means that the corresponding SRR is a start SRR of a session. If S_flag=0b, it means that the corresponding SRR is not a start SRR of a session.

One reason for identifying a start of a session through the S_flag is to provide compatibility with existing disc structures such as DVDs that allocate additional area (for example, border-in/border-out) to distinguish sessions. However, allocation of the additional area reduces the entire recording capacity of the disc. As such, the present invention overcomes this limitation by providing the session identification information (S_flag) in the SRR entry 35. Accordingly, the session structure of the entire disc can be easily recognized using the session identification information S_flag in the SRR entry 35 without having to allocate additional areas to store such session distinguishing information.

For the convenience of description of the present invention, the P_flag and the S_flag are depicted as separate status information stored in separate status fields of an SRR entry, but they can be stored together in one status field of the SRR entry.

The LRA field 34 of the SRR entry 35 is a field for recording an end address (LRA) of user data recorded in the corresponding SRR and stores an end address of the user data (excluding any padding data) recorded in the corresponding SRR FIG. 6C illustrates a detailed structure of the "List of opened SRRs" field 52 of the SRRI in FIG. 5 according to an embodiment of the present invention. The information stored in the field 52 is used to determine the location/identification of each opened SRR. As shown in FIG. 6C, one or more opened SRR numbers are recoded in the "List of opened SRRs" field 52 as location information of the opened SRRs. Two bytes are allocated to record an opened SRR number identifying a particular SRR.

In the present invention, if there are at most sixteen opened SRRs on the disc, the location (identification) of the corresponding opened SRRs (and thus the opened SRR entries) is recorded through each opened SRR number. Accordingly, when loading an optical disc having the disc structure of the present invention, the recording/playback apparatus can determine the location of recordable areas (NWA) of the disc based on the opened SRR information of the present invention. In other words, the location of the opened SRR on the current disc should be known to record data. Since the information identifying whether a corresponding SRR is an opened SRR or a closed SRR is not provided specifically in the SRR entry, the identification/location of the opened SRR is recorded in the header of the SRRI and can be accessed easily, so that the optical recording/playback apparatus is able to easily read the SRR entry associated with the identified opened SRR.

Accordingly, only the SRR having the SRR number recorded on the "List of opened SRRs" field 52 is additionally recordable as an opened SRR. After that, if the SRR is changed into a closed SRR, the SRR number of the closed SRR is removed from the "List of opened SRRs" field 52 so that it is possible to easily distinguish the opened SRR from the closed SRR.

A method for updating the SRRI representing the disc recording status according to the present invention will be now described. Particularly, a method of opening and closing SRRs and sessions, padding an SRR with dummy data and recording SRRIs will be described referring to FIGS. 7A-11B.

FIGS. 7A through 11B illustrate sequentially a method of recording SRRI according to the disc recording status in the write-once optical disc of the present invention. More specifically, FIGS. 7A through 11B show sequentially how the different types of SRRs (shown in FIGS. 2A through 3E) on the disc are created and how to record the SRRI using the sequential steps performed according a time flow. These methods are implemented on the write-once optical disc such as BD-WO having the SRR, the SRRI and the disc structure as discussed herein in connection with FIGS. 1-6C.

Figure 7A:
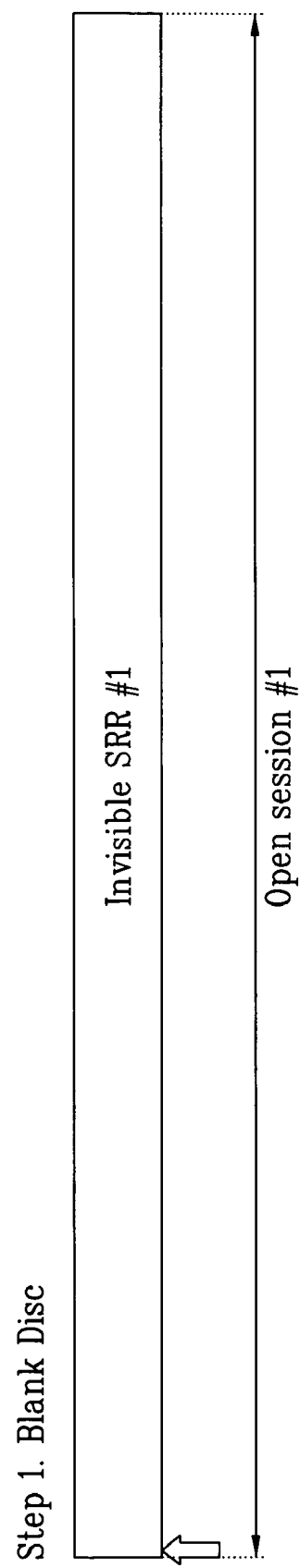
FIGS. 7A through 11B illustrate a process of recording SRRI according to the disc recording status in a write-once optical disc according to the present invention.

FIG. 7A shows Step 1 in which the entire area of the disc is recordable as an initial black disc and a portion designated by a thick arrow indicates the NWA location. The start location of the disc is the NWA. Herein, only one SRR (SRR #1) exists on the disc. This is the invisible SRR shown in FIG. 2A. Accordingly, a session is in the initial state of the disc wherein only one opened session #1 exists. The disc is a blank disc and the SRRI is not yet recorded on the disc.

Figure 7B:
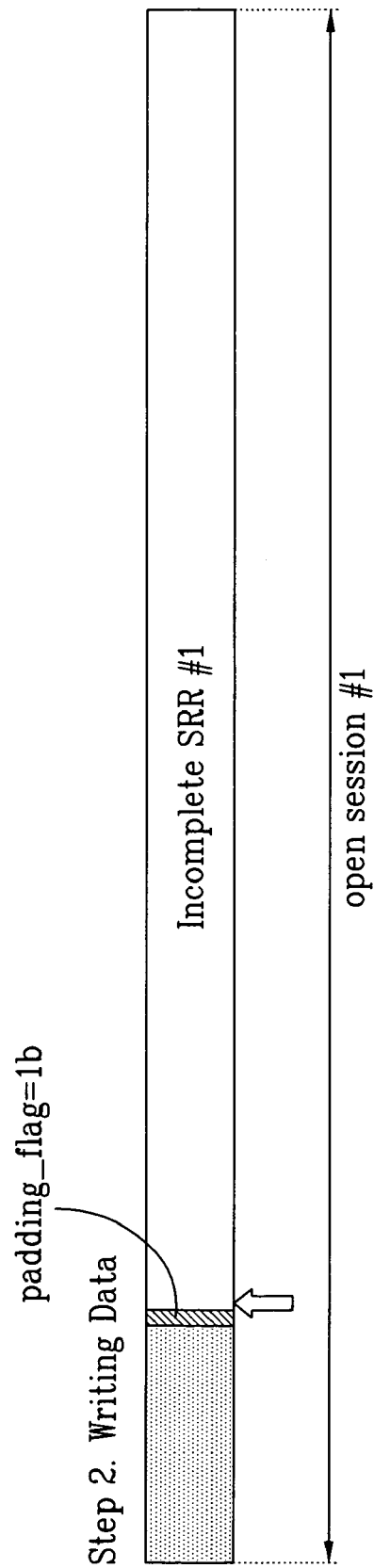

FIG. 7B shows Step 2 in which data (e.g., user data) are partially recorded on the blank disc of FIG. 7A, but the session #1 is not yet closed. Herein, only one SRR (SRR #1) exists on the disc, which is the incomplete SRR shown in FIG. 2B. The session #1 is maintained as the opened session. As shown in FIG. 7B, the user data is recorded in a portion of the incomplete SRR #1 and an unrecorded portion (e.g., sector(s)) of the SRR #1 (cluster) is padded with dummy data. As described above, the padded sector of the SRR is indicated with "Padding_flag=1b" which is recorded in a designated area of the cluster, e.g., within the padded sector of the cluster/SRR #1.

Figure 7C:
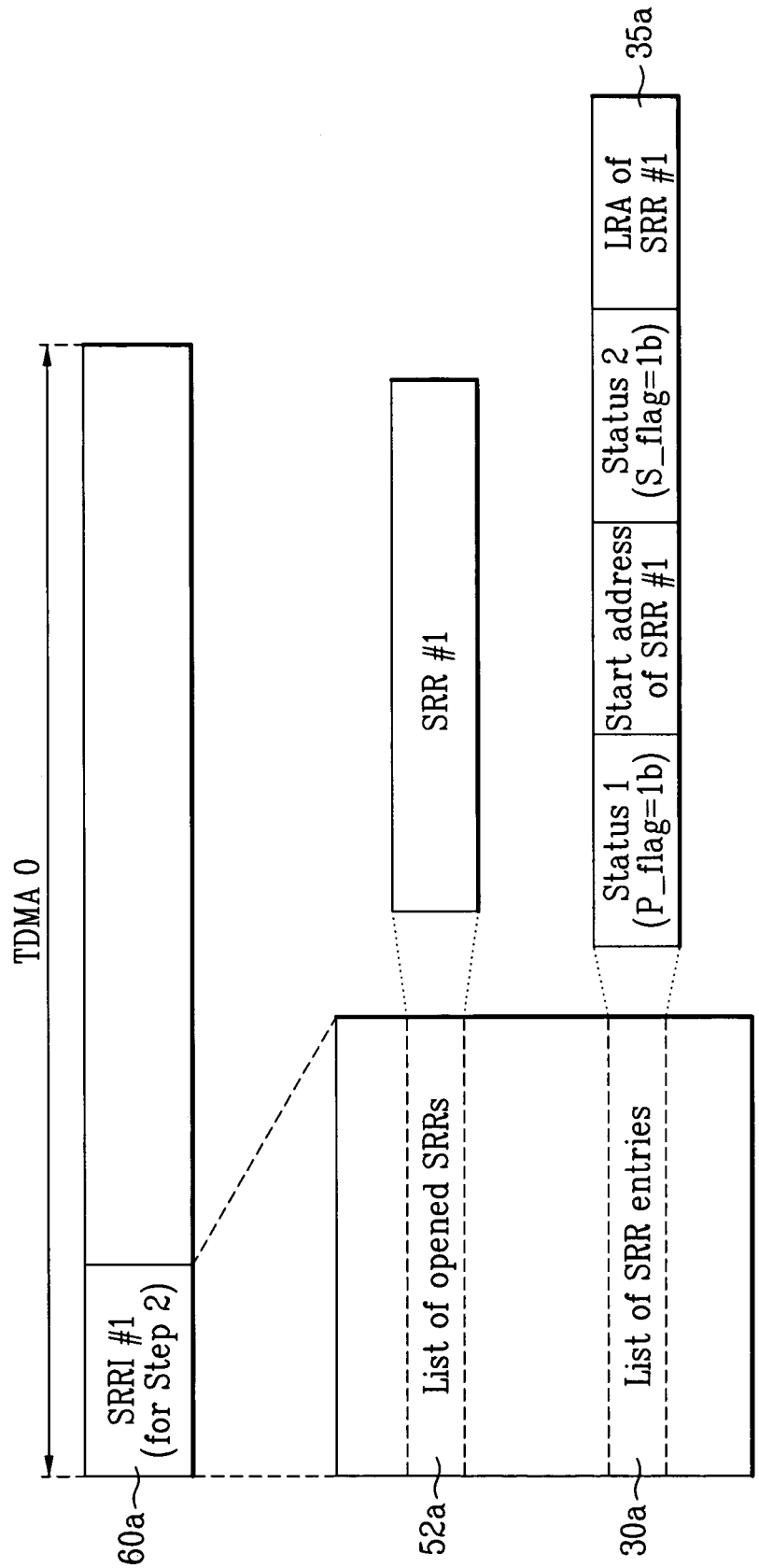

FIG. 7C illustrates a process of recording an SRRI in the management area of the disc when the disc is in the state of FIG. 7B. For the convenience of explanation, only certain portions among all the different components of the disc structure and SRRI structure shown in FIGS. 1 and are shown. For instance, although the (SRRI+TDDS) or (TDFL+TDDS) are recorded in each cluster of the TDMA such as the TDMA0 of the disc as discussed above, only the SRRI is shown in the TDMA0 of FIG. 7C, and the TDFL and/or TDDS is omitted for the sake of clarity. Further, only the "List of opened SRRs" field 52 and the "List of SRR entries" field 30 among the different fields of the SRRI shown in FIG. 5 are shown.

The disc recording status of FIG. 7C is the case where only one opened SRR (SRR #1) is present in all the disc area as in FIG. 7B. As shown in FIG. 7C, when the incomplete SRR #1 is formed without closing the session as in FIG. 7B, the SRRI #1 (60a) pertaining to the SRR #1 is generated and recorded in the TDMA0. In the SRRI #1 (60a), the SRR number (SRR #1) of the opened SRR #1 is recorded in its "List of opened SRRs" field 52a. In the "List of SRR entries" field 30a of the SRRI #1 (60a), only one SRR entry 35a pertaining to the SRR #1 is present. The SRR entry 35a (or SRR entries 35b-35p discussed later) has the SRR entry structure of FIGS. 6A and 6B discussed above.

In the SRR entry 35a, since some portions of the SRR #1 are padded finally, the P_flag is set to "1b" as the status information of the corresponding SRR #1. Since the SRR #1 is the start SRR of the opened session #1, the S_flag is set to "1b" as the status information of the corresponding SRR #1.

Figure 8A:
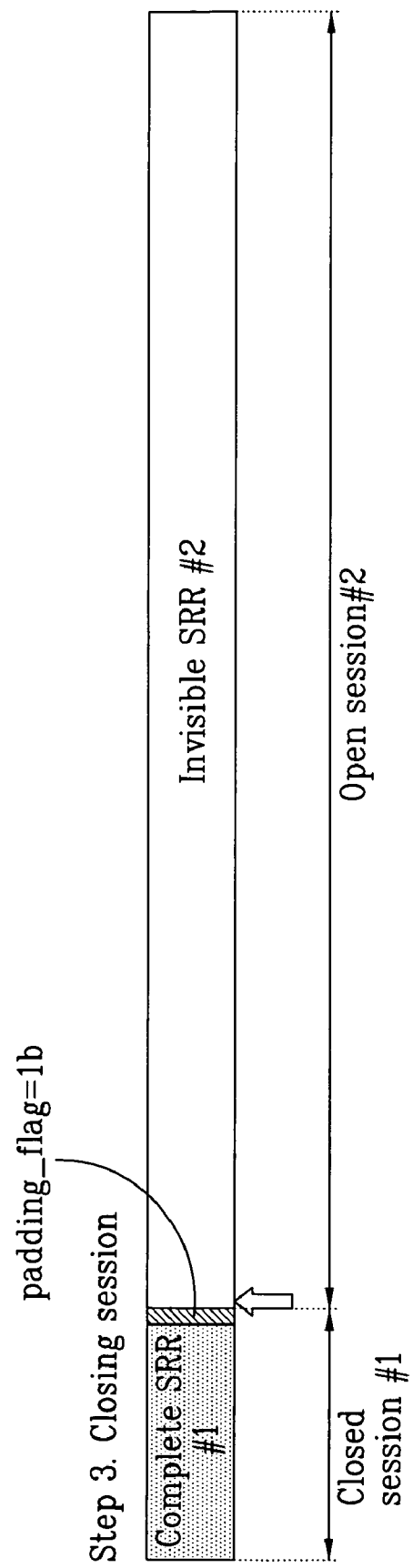

FIG. 8A shows Step 3 in which a session close command is received and executed at Step 2 of FIG. 7B. In response to the session close command, the area on which user data is recorded is separated into an independent closed SRR and a new session is created at the area following the user data recorded area. For instance, as shown in FIG. 8A, the portion of the area that is recorded fully with the user data at Step 2 becomes the complete SRR #1 (closed SRR) which in turn forms the closed session #1. In addition, the unrecorded area becomes an invisible SRR #2 (opened SRR) which in turn forms an opened session #2 at the same time.

Figure 8B:
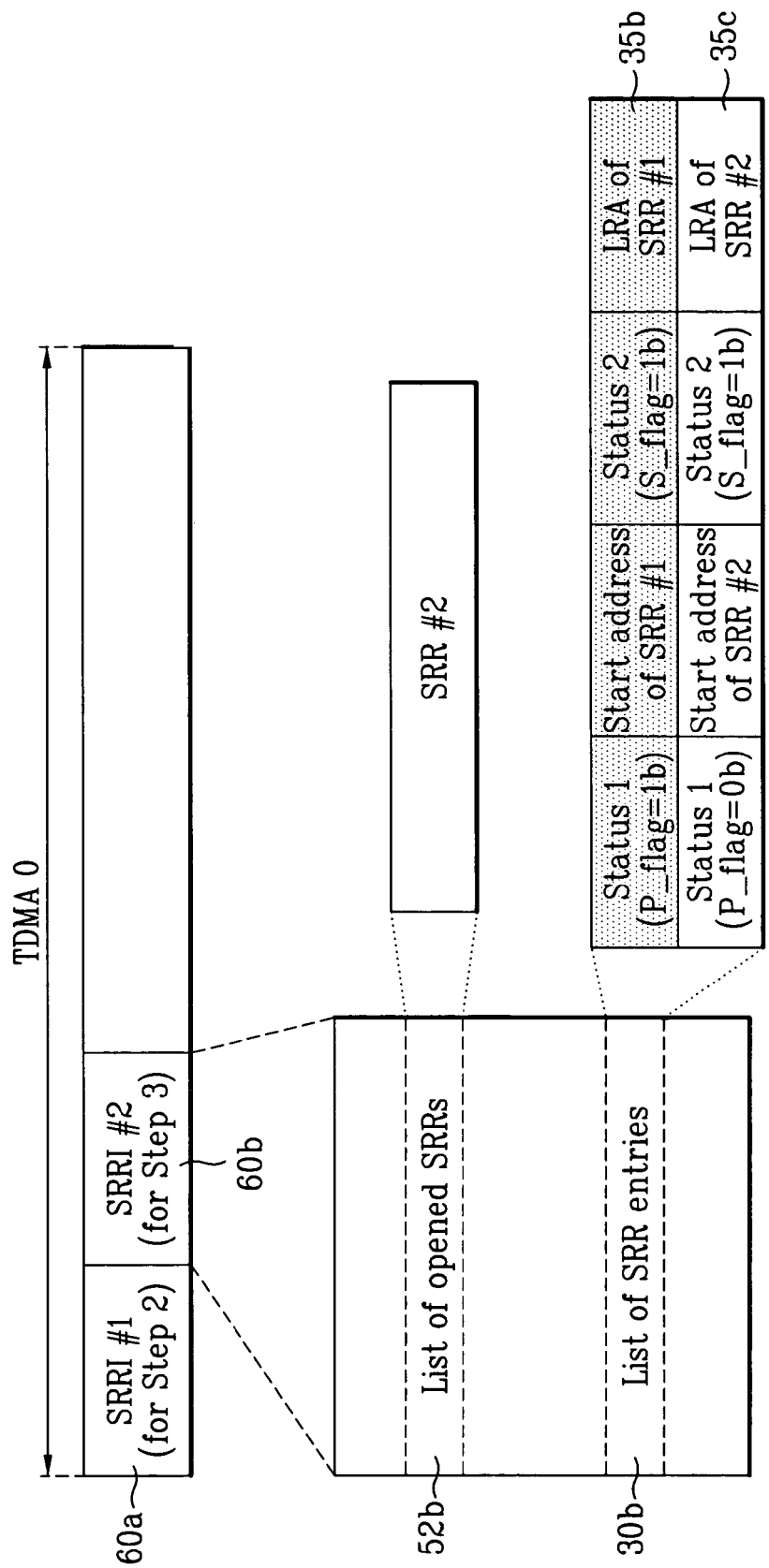

FIG. 8B illustrates a process of recording the disc recording status (SRRI) as it pertains to the disc state as of FIG. 8A. Since the SRRI is a second recorded SRRI, this SRRI is named SRRI #2 (60b). The SRRI #2 (60b) is recorded next to the SRRI #1 (60a) in the TDMA0. For recording the status of the disc of FIG. 8A, since the entire area of the disc has only one opened SRR (SRR #2) and only one closed SRR (SRR #1), the SRR number of the opened SRR #2 is recorded in the "List of opened SRRs" field 52b of the SRRI #2, and information on the SRRs #1 and #2 is recorded in the "List of SRR entries" field 30b of the SRRI #2 respectively as SRR entries 35b and 35c. The SRR entry (e.g., 35b) shadowed in FIG. 8B (and in other figures) indicates that it is a closed SRR entry. Accordingly, since user data is not yet recorded in the newly created SRR #2, the P_flag of the SRR #2 entry (35c) is set to "0b". Since the SRR #2 is the start SRR of the opened session #2, the S_flag of the SRR #2 entry (35c) is set to "1b".

Figure 9A:
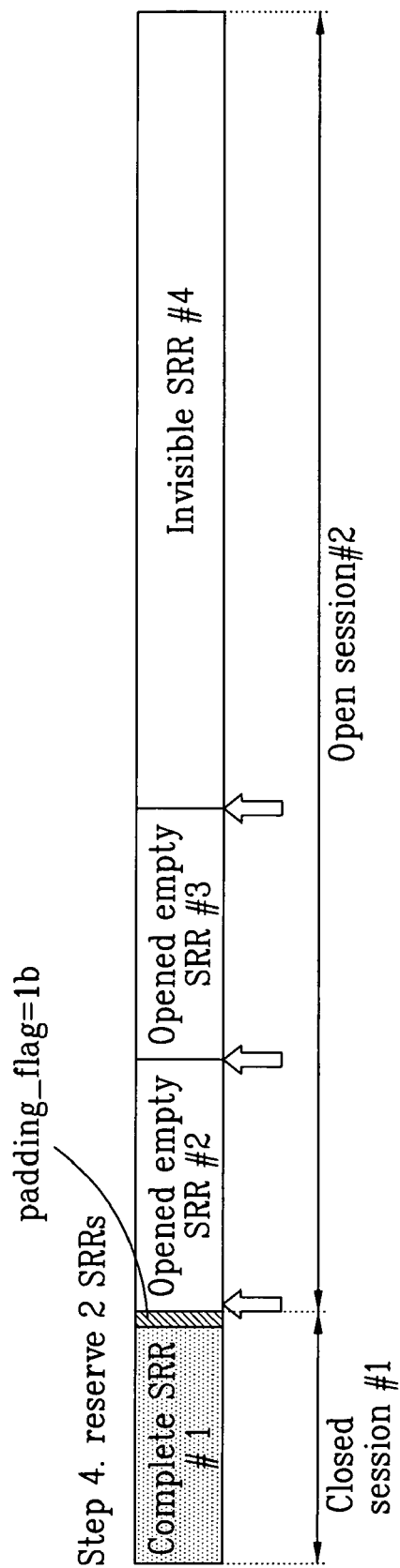

FIG. 9A shows Step 4 in which two opened SRRs are additionally reserved in the opened session #2 to newly record data when the disc is in the state of FIG. 8A. Accordingly, the newly created opened SRRs are opened empty SRRs #2 and #3 and have NWAs indicated by thick arrows. As a result, the opened session #2 is composed of the empty SRRs #2 and #3 and an invisible SRR #4.

Figure 9B:
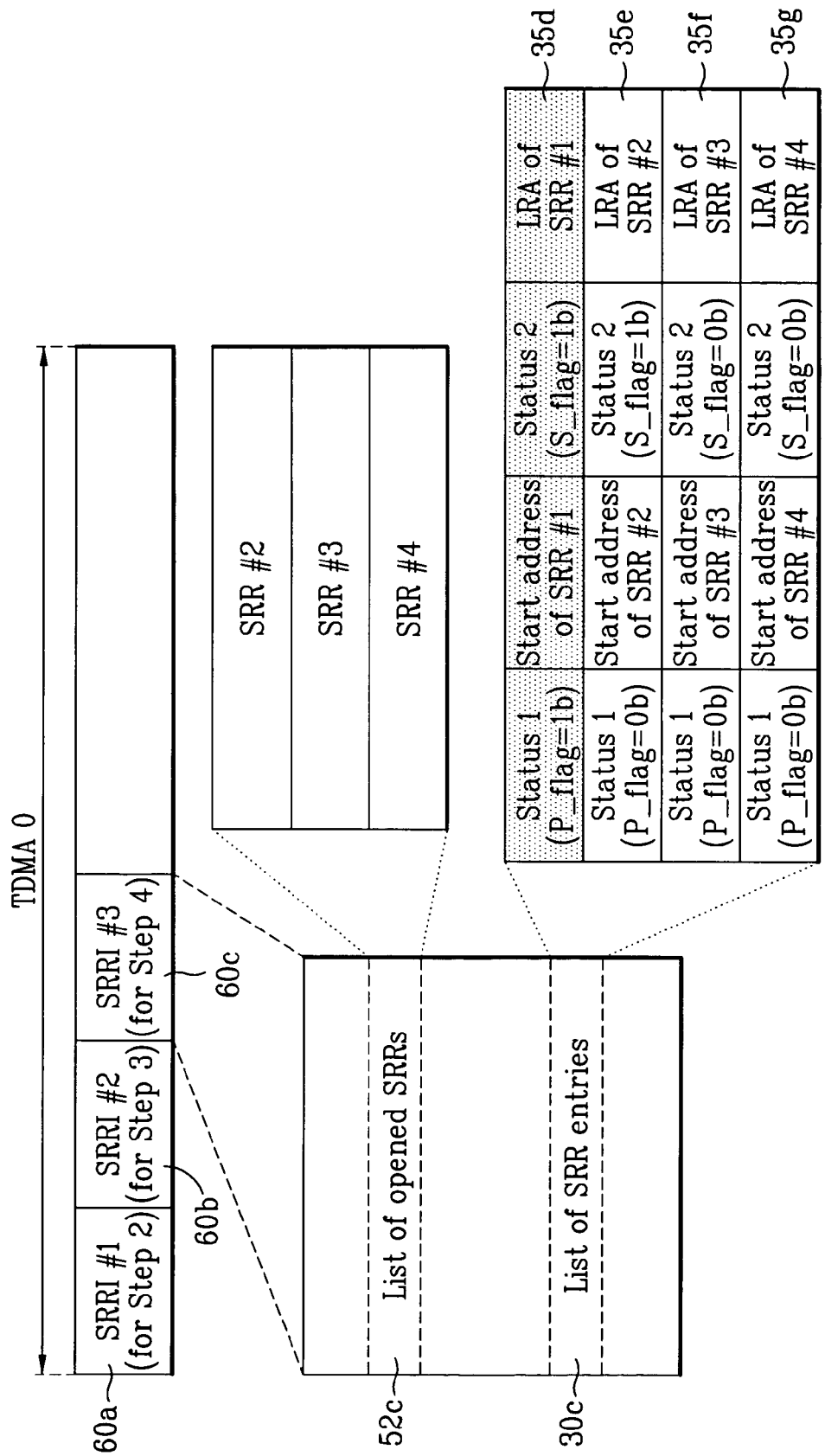

FIG. 9B illustrates a process of recording the disc recording status (SRRI) as it pertains to the disc state as of FIG. 9A. Since the SRRI is a third recorded SRRI, the SRRI is named SRRI #3 (60c). The SRRI #3 (60c) is recorded adjacent to the SRRI #2 (60b) in the TDMA0. For recording the status of the disc of FIG. 9A, since the entire area of the disc has three opened SRRs (SRRs #2, #3 and #4) and one closed SRR (SRR #1), the SRR numbers (SRRs #2, #3 and #4) of the opened SRRs are recorded in the "List of opened SRRs" field 52c of the SRRI #3. Information on all four SRRs (SRRs #1-#4) is recorded in the "List of SRR entries" field 30c of the SRRI #3 respectively as SRR entries 35d-35g.

Accordingly, since information on the newly created SRR #2, #3 and #4 is recorded in the SRRI #3 (60c) and user data is not yet recorded on the SRRs #2, #3 and #4, the P_flags of the corresponding SRR entries 35e, 35f, 35g are set to "1b". However, since the SRRs #3 and #4 are not the start SRR of the opened session #2, but the SRR #2 is the session start SRR, the S_flags of the SRR #2 entry 35e, the SRR #3 entry 35f and the SRR #4 entry 35g are set respectively to "1b", "0b" and "0b".

Figure 10A:
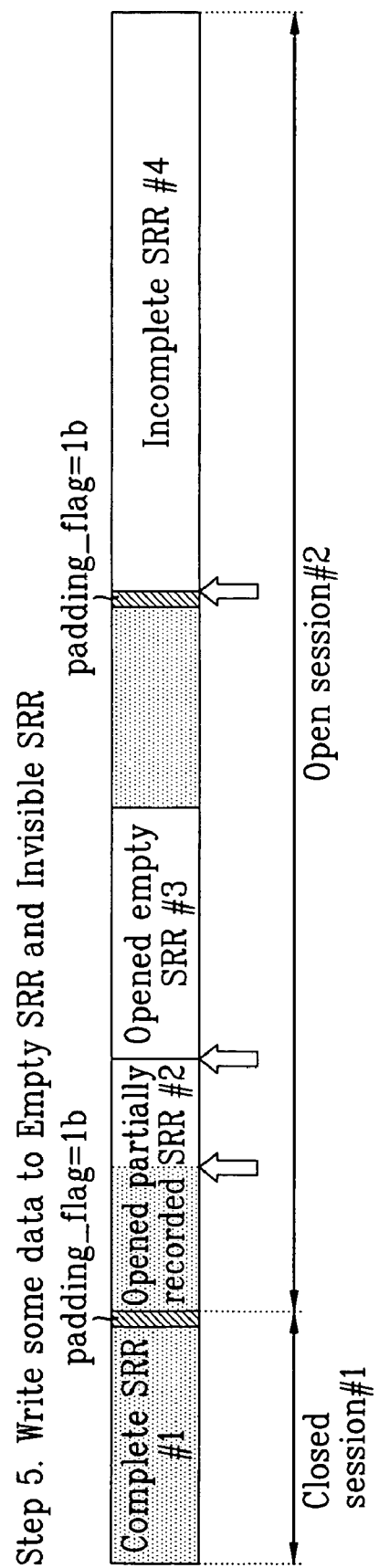

FIG. 10A shows Step 5 in which user data is recorded in the empty SRR #2 and in the invisible SRR #4 of FIG. 9A.

Accordingly, the first empty SRR #2 is changed into a partially recorded SRR #2, and the invisible SRR #4 is changed into an incomplete SRR #4, but the second opened empty SRR #3 is not changed. The SRR #2 is recorded with user data without padding. The SRR #4 is recorded with user data and is also padded with padding data. In the padded sector of the SRR #4, the Padding_flag is set to "1b".

Figure 10B:
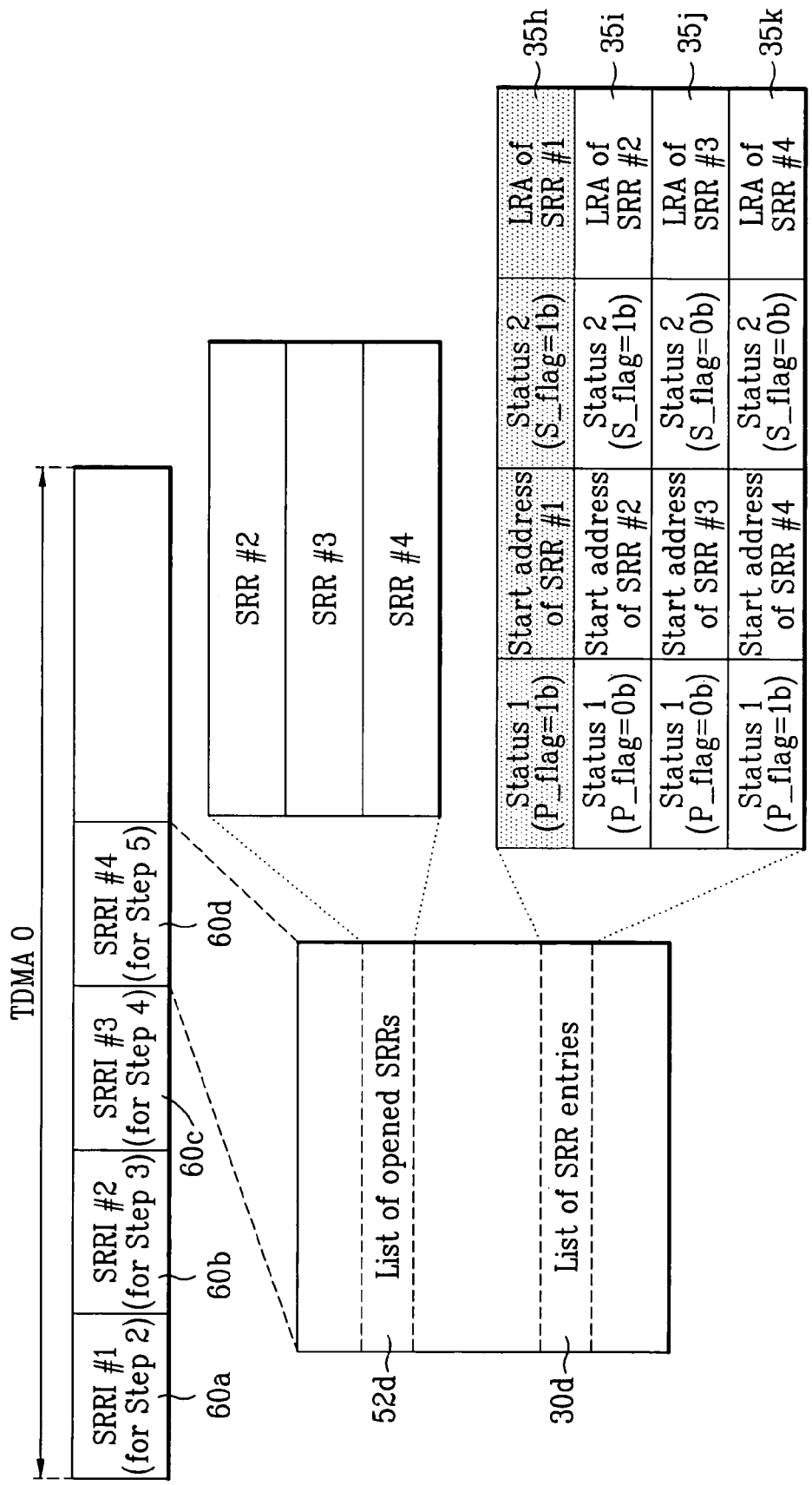

FIG. 10B illustrates a process of recording the disc recording status (SRRI) as it pertains to the disc state as of FIG. 10A. Since the SRRI is a fourth recorded SRRI, the SRRI is named SRRI #4 (60d). The SRRI #4 (60d) is recorded next to the SRRI #3 (60c). For recording the status of the disc of FIG. 10A, since the entire area of the disc has three opened SRRs (SRRs #2-#4) and one closed SRR (SRR #1), the SRR numbers of the opened SRRs (SRRs #2-#4) are recorded in the "List of opened SRRs" field 52d of the SRRI #4 (60d). Information on all four SRRs (SRRs #1-#4) is recorded in the "List of SRR entries" field 30d of the SRRI #4 (60d) respectively as SRR entries 35h-35k.

At this step, the number of the SRR entries and the location of the opened SRRs are the same as those shown in FIG. 9B, but since user data is recorded on a specific opened SRR, the LRA of the recorded opened SRR entry is changed and the value of the P_flag is also changed. In other words, information on the recorded SRRs #2 and #4 is updated. Since the SRR #2 is recorded with user data without padding, the P_flag of the SRR #2 entry 35i is maintained to be "0b". Since the SRR #4 is recorded with user data and is padded, the P_flag of the SRR #4 entry 35k is changed to be "1b". In addition, since the status of the session #2 is not changed, the S_flags in the SRR entries 35h-35k are identical to those of the SRR entries in FIG. 9B.

Figure 11A:
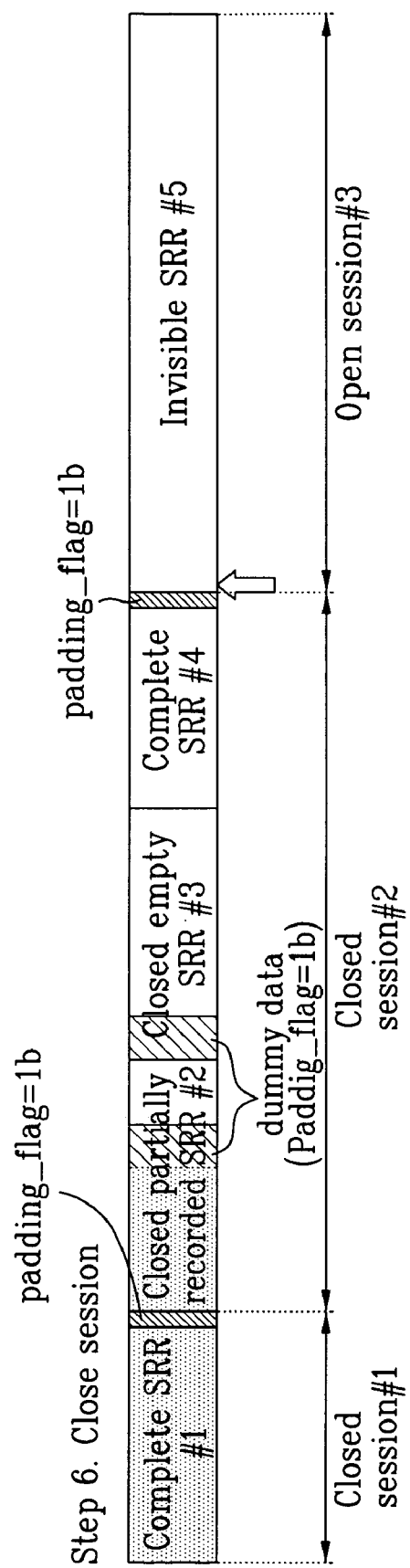

FIG. 11A shows Step 6 in which a session close command is received and executed when the disc is in the state of FIG. 10A. As a result, as shown in FIG. 11A, the session #2 that was an opened session is changed into a closed session #2 and all the SRRs of the session #2 are also closed into closed SRRs #2-#4. Especially, the additionally recordable portion of the opened SRR is padded with dummy data and closed. The entire additionally recordable portion of the opened SRR may be padded with dummy data and closed. It is described above that this is an optional matter. In addition, when the padding is performed, specific data (for example, "CLSD" as character code) may be recordable as the padding data as described above.

The SRRs #2, #3 and #4 that were previously opened SRRs are changed into a closed partially recorded SRR #2, a closed empty SRR #3 and a complete SRR #4, which in turn form the closed session #2. In the SRRs #2 and #3, an additionally recordable area remains but is changed into a closed SRR by a close command. Herein, some portion is alternatively padded with dummy data. Accordingly, all the sectors in the cluster/SRR (e.g. FIG. 4B) padded with dummy data are set with Padding_flag=1b. However, even in this case, LRA recorded in the SRR entry means an end location where the user data are actually recorded. Dummy data portion does not affect the determination of the LRA location as described above. A remaining outermost SRR #5 is an invisible SRR #5, which in turn forms a new opened session #3.

Figure 11B:
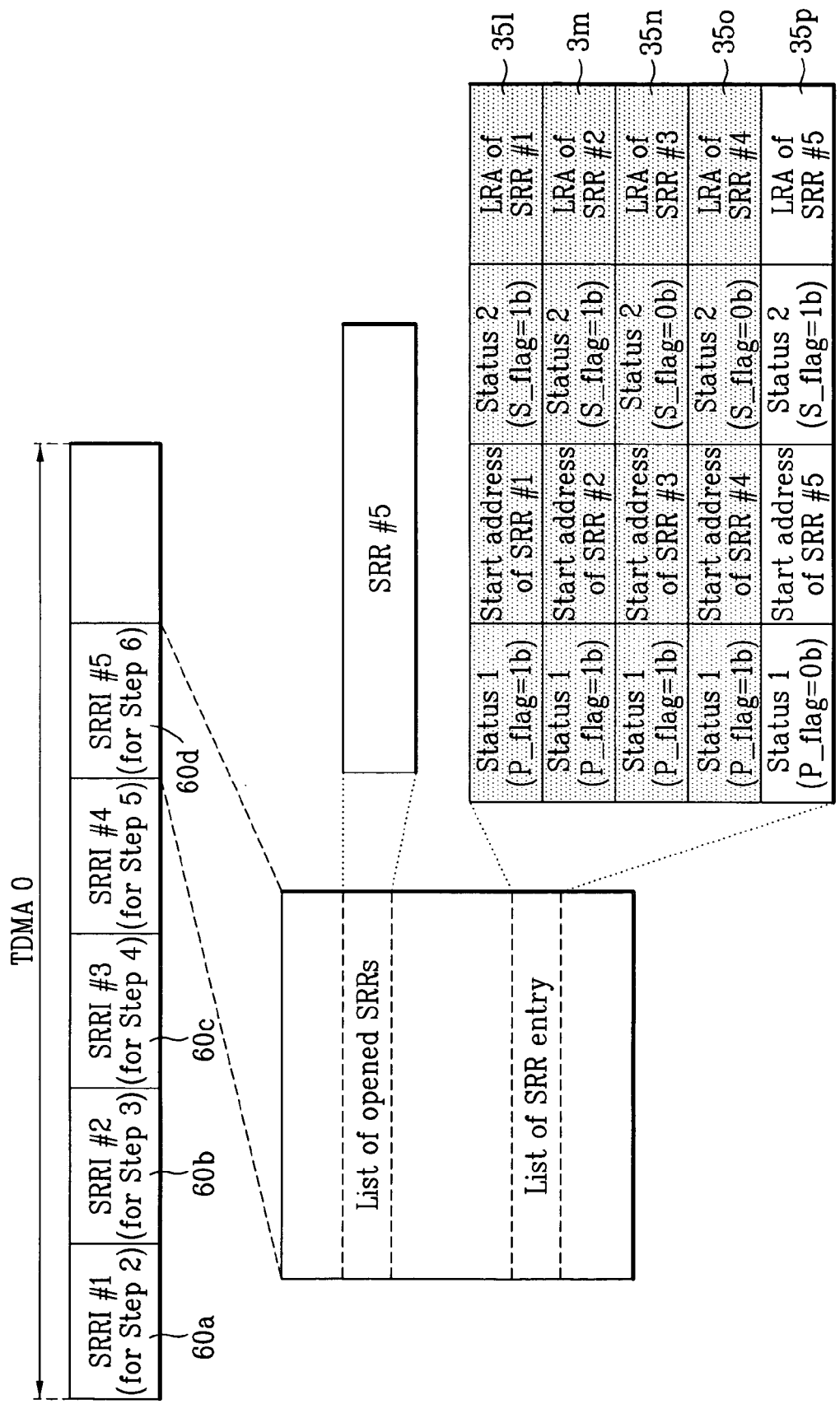

FIG. 11B illustrates a process of recording the disc recording status (SRRI) as it pertains to the disc state as of FIG. 11A. Since the SRRI is a fifth recorded SRRI in the management area, the SRRI is named SRRI #5 (60e). The SRRI #5 (60e) is recorded next to the SRRI #5 (60d) in the TDMA0. For recording the status of the disc of FIG. 11A, since the entire area of the disc has one opened SRR (SRR #5) and four closed SRRs (SRRs #1-#4), the SRR number of the opened SRR (SRR #5) is recorded in the "List of opened SRRs" field 52e of the SRRI #5, and all the previous opened SRR numbers (for example, SRRs #2, #3 and #4 in FIG. 10B) recorded in the SRRI #4 are removed from the current opened SRR list 52e. Removal of the SRRs from the "List of opened SRRs" field means that such SRRs are closed. Information on all five SRRs (SRRs #1-#5) is recorded in the "List of SRR entries" field 30e of the SRRI #5 respectively as SRR entries 35l-35p.

Since the SRRs #2 and #3 are padded with dummy data in response to the close command, the P_flags of the SRR #2 entry 35m and the SRR #3 entry 35n are changed to "1b" to indicate that at least a part of the corresponding SRR is padded with padding data. Since the LRA of an SRR entry is an end location where the user data is actually recorded, the LRAs of the SRRs #2-#4 have the same value as the previous LRAs recorded in the SRRI #4 (60d). In addition, since user data is not yet recorded on the newly created invisible SRR #5, the P_flag of the SRR #5 entry 35p is set to be "0b". Since the SRR #5 is a start SRR of the new session #3, the S_flag of the SRR #5 entry 35p is set to be "1b".

As known from FIGS. 7A through 11B, the SRRI is information representing the recording status of the current disc. When the disc is loaded in the recording/playback apparatus, the recording/playback apparatus checks the latest SRRI (in the above case, the SRRI #5) recorded finally in a management area and thereby knows exactly the current disc recording status including the location of a recordable area/SRR on the disc. Therefore, desired user data can be recorded in the recordable area of an opened session on the disc.

FIG. 12 illustrates an optical disc recording/playback apparatus according to the present invention. This apparatus or other suitable apparatus or system can be used to implement the disc and/or SRRI structures and methods of the present invention discussed herein.

Referring to FIG. 12, the optical disc recording/playback apparatus includes a recording/playback unit 10 for recording and/or reproducing data to/from the optical disc and a controller 20 for controlling the recording/playback unit 10. All the elements of the recording/playback apparatus are operatively coupled. The controller 20 transmits a command for recording and/or reproducing to/from a special recording area such as an SRR/session on the disc, to the recording/playback unit 10. The recording/playback unit 10 records and/or reproduces data to/from the disc according to the commands of the controller 20.

The recording/playback unit 10 includes an interface unit 12, a pick-up unit 11, a data processor 13, a servo unit 14, a memory 15 and a microcomputer 16. The interface unit 12 communicates with external devices such as the controller 20. The pick-up unit 11 records or reproduces data to/from the optical disc directly. The data processor 13 receives a reproduction signal from the pick-up unit 11, restores a preferred signal, modulates a signal proper to the optical disc, and transmits the signal. The servo unit 14 controls the pick-up unit 11 to read the signal from the optical disc or to record the signal to the optical disc. The memory 15 stores temporarily data and various information including management information as discussed herein. The microcomputer 16 controls the components of the recording/playback unit 10. Since the recording/playback apparatus shown in FIG. 12 can selectively perform a padding operation, a designer can more freely design the recording/playback apparatus. The recording/playback unit 10 can automatically store specific data during a padding operation.

The method of recording and playing back data on an optical disc is classified into two kinds. The first one is the case of FIGS. 4A through 11B, which involves the method of completely recording data on an opened SRR, forcedly padding the remaining sector(s) in the cluster including the LRA, and recording information identifying whether or not padding has been performed to the remaining sector(s), or determining whether or not to pad the cluster and recording padding identification information according to the padding when closing an SRR.

The second one is the method of closing all the SRRs in the session when the session is closed. No special buffer zone is provided between a session and the adjacent session. The start location (i.e., session start SRR) of the session is identified by the session identification information such as S_flag.

The recording/playback method of the optical disc according to an embodiment of the present invention will be described in detail. When the optical disc such as a BD-WO is loaded into the recording/playback apparatus such as the one shown in FIG. 12, the latest SRRI is read as the latest disc management information recorded in a TDMA. Furthermore, the SRRI header and the SRR entry(ies) recorded in the latest SRRI are read and temporarily stored in the memory 15 of the recording/playback unit 10.

The stored SRRI represents the latest disc recording status. The opened SRR(s) can be identified through the SRRI header information. Through the SRR entry(ies), data can be recorded in the entire area of the disc or the existence and location of the non-recording status and opened session can be checked. Also, it can be identified whether or not the SRR has been padded with padding data. All such information can be used when the optical disc is recorded and played back.

Then, data (e.g., user data) is recorded on a specific opened SRR. When the data is completely recorded in the opened SRR, the unrecorded sector(s) in the cluster including the LRA is padded with dummy data (e.g., for stability and robust reasons) and the padding identification information Padding_flag is set to "1b". For each of the padded sectors, Padding_flag corresponding to each sector is set to "1b". If the sector is not padded, then the corresponding Padding_flag is set to "0b". Also, when the SRR entry in the SRRI is updated, the SRR status information P_flag is set to "1b" to indicate that the corresponding SRR has at least some part that is padded.

Additionally, in the case that all the SRR in the session are closed by a session close command of the controller 20 and in the case that only the corresponding SRR is closed by an SRR close command of the controller 20, the microcomputer 16 can select whether a recordable area (for example, one cluster) in the closed SRR is closed after padding or without padding. In the above case, a designer can design so that the recording/playback unit 10 automatically pads the SRR with padding data and closes the SRR unconditionally without a padding command from the controller 20. The above function is called "automatic padding function" by the recording/playback unit 10. The automatic padding function is more advantageous to reduce padding operation time, compared to the case where the recording/playback unit 10 receives dummy data by a padding command and pads the SRR thereafter.

In addition, if the SRR status is changed by padding as described above, the Padding_flag is set to 1b according to each padded sector. Furthermore, the P_flag is set to 1b in the corresponding SRR entry. Different recording/playback apparatuses can use such information. Additionally, as for a start SRR of a new opened session, the S_flag is set to 1b in the corresponding SRR entry to indicate the start location of the opened session.

Accordingly, the types and definitions of the SRRs as defined by the present invention and a method of recording the SRRI according to the defined SRR types and definitions, are provided. Accordingly, various recording/playback apparatuses having desired functions can be used to access the present disc.

The method for recording management information of the write-once optical disc according to the present invention includes defining new SRR types and session types. If an open SRR is padded or if the SRR is closed by padding, padding identification information Padding_flag is set appropriately and recorded in the padded area. Other padding identification information P_flag and the session identification information S_flag are recorded in the SRR entry. Consequently, in the write-once optical disc having the new physical structure, the management information can be effectively recorded and managed.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for optically recording management information on a computer readable recording medium including an opened session composed of at least one sequential recording-unit, the method comprising:
   closing the opened session, the closing step including closing all opened sequential recording-units of the opened session to close the opened session;
   opening a new session having a new sequential recording-unit; and
   optically recording session start information on the computer readable recording medium, the session start information indicating whether or not the new sequential recording-unit is a start of the new session, wherein the session start information is used to distinguish sessions.

2. The method of claim 1, wherein in the recording step, the session start information is recorded in a sequential recording-unit information entry associated with the new sequential recording-unit.

3. The method of claim 2, wherein the sequential recording-unit information entry is recorded in a temporary disc management area of the computer readable recording medium.

4. The method of claim 2, wherein the session start information is represented with a session start flag.

5. The method of claim 1, wherein the step of closing the opened session further includes:
   padding at least one un-recorded cluster of at least one opened sequential recording-unit to be closed, each of the at least one un-recorded cluster being composed of a plurality of sectors; and
   recording padding identification information indicating whether the padding step is performed.

6. The method of claim 5, wherein the padding identification information includes a plurality of padding flags, wherein each of the padding flags is related to each of the sectors and indicates whether or not the related sector is padded.

7. The method of claim 1, further comprising:
   recording, in a sequential recording-unit information on the computer readable recording medium, identification numbers of opened sequential recording-units on the computer readable recording medium.

8. The method of claim 7, wherein the step of closing the opened sequential recording-units, identification numbers of the closed sequential recording-units are removed from the sequential recording-unit information.

9. The method of claim 1, wherein the new sequential recording-unit has a start address but no end address.

10. A method of optically recording management information on a computer readable recording medium including an opened session composed of at least one sequential recording range (SRR), the method comprising:

closing the opened session, the closing step including closing all opened SRRs of the opened session to close the opened session, and padding at least one un-recorded unit of at least one of the opened SRRs of the opened session so as to provide stability to the computer readable recording medium; and optically recording, on the computer readable recording medium, padding identification information indicating which unit is padded, wherein the padding identification information is used to distinguish a unit that is padded from a unit that is recorded with other data, and is used to manage a recording/reproducing operation of the computer readable recording medium.

11. The method of claim 10, wherein the padding identification information includes a plurality of padding flags each assigned to a sector of the at least one opened SRR, and the padding flags are set to a certain value depending on whether or not the assigned sector is padded.

12. The method of claim 11, wherein there are 32 padding flags corresponding respectively to 32 sectors of a cluster of the SRR.

13. The method of claim 10, further comprising:

recording, in an SRR information (SRRI) on the computer readable recording medium, identification numbers of all opened SRRs.

14. The method of claim 13, where in the step of closing the opened SRRs, identification numbers of the closed SRRs are removed from the SRRI.

15. The method of claim 10, further comprising:

recording session start information indicating whether a particular SRR is a start of a session.

16. A method of managing a computer readable recording medium, the computer readable recording medium having an opened session including one or more recording units to store user data sequentially, the method comprising:

optically recording opened recording unit information indicating which recording unit is opened and available to store the user data, wherein all opened recording units of the opened session are closed when closing the opened session; and optically recording, on the computer readable recording medium, padding identification information indicating whether or not each of the opened recording units is padded with dummy data when closing the each of the opened recording units, wherein the computer readable recording medium has one opened session and at most a predetermined number of opened recording units, and wherein the padding identification information is used to distinguish a unit that is padded from a unit that is recorded with other data, and is used to manage a recording/reproducing operation of the computer readable recording medium.

17. A computer readable recording medium comprising:

an opened session composed of at least one sequential recording-unit, wherein when closing the opened session, all opened sequential recording-units of the opened session are closed;

a new session having a new sequential recording-unit and created after the opened session is closed; and session start information recorded on the computer readable recording medium, the session start information indicating whether or not the new sequential recording-unit is a start of the new session, wherein the session start information is used to distinguish sessions.

18. The computer readable recording medium of claim 17, wherein the session start information is recorded in a sequential recording-unit information entry associated with the new sequential recording-unit.

19. The computer readable recording medium of claim 18, wherein the sequential recording-unit information entry is recorded in a temporary disc management area of the computer readable recording medium.

20. The computer readable recording medium of claim 18, wherein the session start information is represented with a session start flag.

21. The computer readable recording medium of claim 17, wherein when closing the opened session, at least one un-recorded cluster of at least one opened sequential recording-unit is padded, each of the at least one un-recorded cluster being composed of a plurality of sectors, and the computer readable recording medium further comprises recording padding identification information indicating whether the padding is performed.

22. The computer readable recording medium of claim 21, wherein the padding identification information includes a plurality of padding flags, wherein each of the padding flags is related to each of the sectors and indicates whether or not the related sector is padded.

23. The computer readable recording medium of claim 17, further comprising:

identification numbers of opened sequential recording-units, the identification numbers being recorded in a sequential recording-unit information on the computer readable recording medium.

24. The computer readable recording medium of claim 23, where when closing the opened session, identification numbers of the closed sequential recording-units are removed from the sequential recording-unit information.

25. The computer readable recording medium of claim 17, wherein the new sequential recording-unit has a start address but no end address.

26. A computer readable recording medium comprising:

an opened session composed of at least one sequential recording range (SRR), wherein when closing the opened session, all opened SRRs of the opened session are closed, and at least one un-recorded unit of at least one of the opened SRRs of the opened session is padded so as to provide stability to the computer readable recording medium; and padding identification information recorded on the computer readable recording medium and indicating which unit is padded, wherein the padding identification information is used to distinguish a unit that is padded from a unit that is recorded with other data, and is used to manage a recording/reproducing operation of the computer readable recording medium.

27. The computer readable recording medium of claim 26, wherein the padding identification information includes a plurality of padding flags each assigned to a sector of the at least one opened SRR, and the padding flags are set to a certain value depending on whether or not the assigned sector is padded.

28. The computer readable recording medium of claim 27, wherein there are 32 padding flags corresponding respectively to 32 sectors of a cluster of the SRR.

29. The computer readable recording medium of claim 26, further comprising:

identification numbers of opened SRRs, the identification numbers being recorded in an SRR information (SRRI) on the computer readable recording medium.

30. The computer readable recording medium of claim 29, where when closing the opened SRRs, identification numbers of the closed SRRs are removed from the SRRI.

31. The computer readable recording medium of claim 26, further comprising:

session start information recorded on the computer readable recording medium and indicating whether a particular SRR is a start of a session.

32. An apparatus for optically recording management information on a computer readable recording medium including an opened session composed of at least one sequential recording-unit, the apparatus comprising:

a recording/reproducing part configured to close the opened session by closing all opened sequential recording-units of the opened session, to open a new session having a new sequential recording-unit after the opened session has been closed, and to record session start information on the computer readable recording medium, the session start information indicating whether or not the new sequential recording-unit is a start of the new session, wherein the session start information is used to distinguish sessions.

33. The apparatus of claim 32, wherein the recording/reproducing part is configured to include the session start information into a sequential recording-unit information entry associated with the new sequential recording-unit, and record the sequential recording unit information entry in a temporary disc management area of the recording medium.

34. The apparatus of claim 32, wherein when closing the opened session, the recording/reproducing part is configured to:

pad at least one un-recorded cluster of at least one opened sequential recording-unit to be closed, each of the at least one un-recorded cluster being composed of a plurality of sectors; and record, on the recording medium of the write-once optical disc, padding identification information indicating whether the at least one un-recorded cluster is padded.

35. The apparatus of claim 34, wherein the padding identification information includes a plurality of padding flags, wherein each of the padding flags is related to each of the sectors and indicates whether or not a related sector is padded.

36. The apparatus of claim 32, wherein the recording/reproducing part is configured to record, in sequential recording-unit information on the recording medium, identification numbers of opened sequential recording-units on the recording medium.

37. The apparatus of claim 32, wherein, when closing the opened sequential recording-units, the recording/reproducing part is configured to remove, from the sequential recording-unit information, identification numbers of sequential recording-units to be closed.

38. The apparatus of claim 32, wherein the new sequential recording-unit has a start address but no end address.

39. An apparatus for optically recording management information on a computer readable recording medium including an opened session composed of at least one sequential recording range (SRR), the apparatus comprising:

a recording/reproducing part configured to close the opened session by closing all opened SRRs of the opened session and selectively padding at least one un-recorded unit of at least one of the opened SRRs of the opened session, and to record padding identification information indicating which unit is padded, wherein the padding identification information is used to distinguish a unit that is padded from a unit that is recorded with other data, and is used to manage a recording/reproducing operation of the computer readable recording medium.

40. The apparatus of claim 39, wherein the padding identification information includes a plurality of padding flags each assigned to a sector of the at least one opened SRR, and the padding flags are set to a certain value depending on whether or not the assigned sector is padded.

41. The apparatus of claim 40, wherein there are 32 padding flags corresponding respectively to 32 sectors of a cluster of the SRR.

42. The apparatus of claim 39, wherein the recording/reproducing part is configured to record, in SRR information (SRRI) on the recording medium, identification numbers of all opened SRRs.

43. The apparatus of claim 41, wherein when closing the opened session the recording/reproducing part is configured to remove the identification numbers from the SRRI.

44. The apparatus of claim 39, wherein the recording/reproducing part is configured to record session start information indicating whether a particular SRR is a start of a session.

45. A computer readable recording medium having an opened session including one or more recording units to store user data sequentially, the computer readable recording medium comprising:

opened recording unit information indicating which recording unit is opened and available to store the user data, wherein all opened recording units of the opened session are closed when closing the opened session; and padding identification information indicating whether or not each of the opened recording units is padded with dummy data when closing the each of the opened recording units, wherein the computer readable recording medium has one opened session and at most a predetermined number of opened recording units, and wherein the padding identification information is used to distinguish a unit that is padded from a unit that is recorded with other data, and is used to manage a recording/reproducing operation of the computer readable recording medium.

* * * * *